(12) United States Patent
Bullock et al.

(10) Patent No.: US 10,710,778 B2
(45) Date of Patent: Jul. 14, 2020

(54) INSULATING CONTAINER

(71) Applicant: YETI Coolers, LLC, Austin, TX (US)

(72) Inventors: Dustin Bullock, Austin, TX (US); John Loudenslager, Austin, TX (US); John Fritz, Austin, TX (US); Alex Baires, Austin, TX (US); Erik Steven Larson, Austin, TX (US); Andrew J. Winterhalter, Austin, TX (US); Lance Harrison, Austin, TX (US); Michael Christopher Cieszko, Austin, TX (US)

(73) Assignee: YETI Coolers, LLC, Austin, TX (US)

(*) Notice: Subject to any disclaimer, the term of this patent is extended or adjusted under 35 U.S.C. 154(b) by 0 days.

(21) Appl. No.: 16/218,089

(22) Filed: Dec. 12, 2018

(65) Prior Publication Data
US 2020/0189807 A1 Jun. 18, 2020

(51) Int. Cl.
F25D 3/08 (2006.01)
B65D 45/20 (2006.01)
(Continued)

(52) U.S. Cl.
CPC ....... B65D 43/164 (2013.01); B65D 81/3834 (2013.01); A45C 11/20 (2013.01); B65D 43/22 (2013.01); B65D 45/20 (2013.01)

(58) Field of Classification Search
CPC .. B65D 43/164; B65D 81/3834; B65D 43/22; B65D 45/20; A45C 11/20
(Continued)

(56) References Cited

U.S. PATENT DOCUMENTS 1,004,688 A 10/1911 Hunt
2,555,126 A 5/1951 Greve
(Continued)

FOREIGN PATENT DOCUMENTS

CA 152932 A 1/1914
CN 106246966 A 12/2016
(Continued)

OTHER PUBLICATIONS gore.com/protectivevents—screw-in series—"Increase outdoor enclosure durability in harsh environments" p. 1-4.
(Continued)

Primary Examiner — J. Gregory Pickett
Assistant Examiner — Niki M Eloshway
(74) Attorney, Agent, or Firm — Banner & Witcoff, Ltd.

(57) ABSTRACT

An insulating container having a base and a lid is provided. The lid may be rotatable about a hinge from a closed configuration to an open configuration and may be secured, via one or more latching devices, in the closed configuration. In some examples, the insulating container further includes a pressure regulation device. In other examples, the latching devices further include an elastomeric latch upper and a semi-rigid latch lower configured to engage an insulating container keeper when the when the lid is in a closed and a secured position. In still other examples, the latch upper and the latch lower are configured in a recessed position, and flush with a front side of the insulating container lid and flush with a front side of a bottom portion of the insulating container when the latch device secures the lid in a closed position.

21 Claims, 12 Drawing Sheets

(51) Int. Cl.
  B65D 43/16 (2006.01)
  B65D 81/38 (2006.01)
  B65D 45/16 (2006.01)
  B65D 43/22 (2006.01)
  A45C 11/20 (2006.01)

(58) Field of Classification Search
  USPC .................................. 220/836, 324, 592.03
  See application file for complete search history.

(56) References Cited

U.S. PATENT DOCUMENTS

| | | | |
|---|---|---|---|
| 2,652,698 A | 11/1951 | Schlumbohm | |
| 2,706,895 A | 6/1954 | Thompson et al. | |
| 2,803,368 A | 12/1954 | Koch | |
| 2,856,092 A | 9/1956 | Knapp | |
| 2,850,885 A | 11/1956 | Mohr et al. | |
| 3,035,733 A | 5/1962 | Knapp | |
| 3,414,160 A | 12/1968 | Weber | |
| 4,143,695 A | 3/1979 | Hoehn | |
| 4,162,029 A | 7/1979 | Gottsegen et al. | |
| 4,351,165 A | 9/1982 | Gottsegen et al. | |
| 4,368,819 A | 1/1983 | Durham | |
| 4,459,827 A | 7/1984 | Rhodes | |
| 4,484,682 A | 11/1984 | Crow | |
| 4,537,044 A | 8/1985 | Putnam | |
| 4,592,482 A | 6/1986 | Seager | |
| 4,623,076 A | 11/1986 | Karpal | |
| 4,648,512 A | 3/1987 | Tarozzi et al. | |
| 4,802,344 A | 2/1989 | Livingston et al. | |
| 4,846,493 A | 7/1989 | Mason | |
| 4,858,444 A | 8/1989 | Scott | |
| 4,873,841 A | 10/1989 | Bradshaw et al. | |
| 4,939,912 A | 7/1990 | Leonovich, Jr. | |
| 4,988,216 A | 1/1991 | Lyman | |
| 5,007,250 A | 4/1991 | Musielak | |
| 5,024,359 A | 6/1991 | Thomas | |
| 5,044,513 A | 9/1991 | Van Berne | |
| 5,050,767 A | 9/1991 | Peer | |
| D324,165 S | 2/1992 | Bressler et al. | |
| 5,095,718 A | 3/1992 | Ormond et al. | |
| 5,169,018 A | 12/1992 | Fiore | |
| 5,184,477 A | 2/1993 | Brown et al. | |
| D333,775 S | 3/1993 | Krape | |
| 5,213,381 A | 5/1993 | Anderson | |
| 5,249,438 A | 10/1993 | Rhaney et al. | |
| 5,251,460 A | 10/1993 | DeMarco et al. | |
| 5,251,542 A | 10/1993 | Itoh et al. | |
| 5,259,215 A | 11/1993 | Rocca | |
| 5,284,294 A | 2/1994 | Floyd | |
| 5,295,365 A | 3/1994 | Redford | |
| 5,313,817 A | 5/1994 | Meinders | |
| 5,319,937 A | 6/1994 | Fritsch et al. | |
| 5,329,787 A | 7/1994 | Friday | |
| 5,350,081 A | 9/1994 | Graham | |
| 5,363,977 A | 11/1994 | Hoff | |
| 5,373,708 A | 12/1994 | Dumoulin, Jr. | |
| 5,400,610 A | 3/1995 | Macedo | |
| 5,403,095 A | 4/1995 | Melk | |
| 5,423,426 A | 6/1995 | Harper | |
| 5,447,041 A | 9/1995 | Piechota | |
| 5,460,285 A | 10/1995 | Harding, Sr. | |
| 5,562,228 A | 10/1996 | Ericson | |
| 5,626,373 A | 5/1997 | Chambers et al. | |
| 5,738,238 A | 4/1998 | Yang | |
| 5,740,940 A | 4/1998 | Weiss | |
| 5,845,515 A | 12/1998 | Nelson | |
| 5,860,281 A | 1/1999 | Coffee et al. | |
| 5,865,037 A | 2/1999 | Bostic | |
| 5,913,448 A | 6/1999 | Mann et al. | |
| 5,944,205 A | 8/1999 | LaJoie et al. | |
| 6,067,813 A | 5/2000 | Smith | |
| 6,092,661 A | 7/2000 | Mogil | |
| 6,158,745 A | 12/2000 | Deighton | |
| 6,176,499 B1 | 1/2001 | Conrado et al. | |
| 6,192,703 B1 | 2/2001 | Salyer et al. | |
| 6,193,097 B1 | 2/2001 | Martin Perianes et al. | |
| 6,199,570 B1 | 3/2001 | Patarra | |
| 6,244,066 B1 | 6/2001 | LaRose | |
| 6,244,458 B1 | 6/2001 | Frysinger et al. | |
| 6,296,134 B1 | 10/2001 | Cardinale | |
| 6,296,165 B1 | 10/2001 | Mears | |
| 6,305,547 B1 | 10/2001 | Curran | |
| 6,336,577 B1 | 1/2002 | Harris et al. | |
| 6,398,272 B1 | 6/2002 | Plummer et al. | |
| 6,409,066 B1 | 6/2002 | Schneider et al. | |
| 6,427,886 B1 | 8/2002 | Essex | |
| 6,457,750 B1 | 10/2002 | Sokurenko et al. | |
| 6,484,880 B1 | 11/2002 | Shaeffer | |
| 6,622,881 B2 | 9/2003 | Hardigg | |
| D482,241 S | 11/2003 | Tyler | |
| 6,698,608 B2 | 3/2004 | Parker et al. | |
| 6,736,309 B1 | 5/2004 | Westerman et al. | |
| 6,739,150 B2 | 5/2004 | Mompo Garcia | |
| D491,440 S | 6/2004 | Pfeiffer et al. | |
| D492,184 S | 6/2004 | Parker et al. | |
| 6,789,692 B2 | 9/2004 | Prezelin | |
| 6,789,693 B2 | 9/2004 | Lassiter | |
| 6,955,381 B2 | 10/2005 | Parker et al. | |
| 6,976,370 B2 | 12/2005 | Fiene | |
| 6,993,931 B1 | 2/2006 | Hamilton | |
| 7,013,671 B1 | 3/2006 | Bolda | |
| 7,066,347 B2 | 6/2006 | Slovak et al. | |
| 7,128,369 B2 | 10/2006 | Boggs et al. | |
| 7,147,125 B1 | 12/2006 | Slovak et al. | |
| 7,243,676 B2 | 7/2007 | Bailey | |
| D548,565 S | 8/2007 | Vickers | |
| 7,313,927 B2 | 1/2008 | Barker | |
| 7,328,818 B2 | 2/2008 | Prabucki | |
| 7,344,028 B2 | 3/2008 | Hanson | |
| 7,357,709 B2 | 4/2008 | Zukor et al. | |
| 7,360,784 B2 * | 4/2008 | Stewart | B60J 7/1614 220/4.16 |
| 7,389,608 B1 | 6/2008 | MacKay | |
| 7,412,846 B2 | 8/2008 | Sekiya et al. | |
| 7,461,871 B2 | 12/2008 | Vauchel | |
| 7,540,364 B2 | 6/2009 | Sanderson | |
| D598,194 S | 8/2009 | Turvey et al. | |
| 7,597,478 B2 | 10/2009 | Pruchnicki et al. | |
| 7,621,417 B2 | 11/2009 | Peterson et al. | |
| 7,658,213 B1 | 2/2010 | Anderson et al. | |
| 7,677,406 B2 | 3/2010 | Maxson | |
| 7,677,580 B2 | 3/2010 | Vanderberg et al. | |
| 7,726,880 B2 | 6/2010 | Zimmerman et al. | |
| 7,735,334 B2 | 6/2010 | Johnson | |
| 7,806,271 B1 | 10/2010 | Kraska | |
| 7,837,053 B2 | 11/2010 | Arnett et al. | |
| 7,841,635 B2 | 11/2010 | Fuchs | |
| 7,874,743 B2 | 1/2011 | Berkey et al. | |
| 7,905,243 B2 | 3/2011 | Minard et al. | |
| 8,016,153 B2 | 9/2011 | Boenig et al. | |
| 8,052,004 B2 | 11/2011 | Cheng et al. | |
| 8,123,236 B1 | 2/2012 | Helenihi | |
| 8,152,367 B2 | 4/2012 | Roberts et al. | |
| 8,176,749 B2 | 5/2012 | LaMere et al. | |
| 8,191,747 B2 | 6/2012 | Pruchnicki | |
| 8,215,518 B2 | 7/2012 | Hyde et al. | |
| 8,251,245 B2 | 8/2012 | DiPietro et al. | |
| 8,256,156 B1 | 9/2012 | Burgoyne, Jr. | |
| 8,297,464 B2 | 10/2012 | Grenier et al. | |
| 8,308,008 B2 | 11/2012 | Perry et al. | |
| 8,353,418 B2 | 1/2013 | Bork | |
| 8,430,284 B2 | 4/2013 | Broadbent et al. | |
| 8,544,670 B2 | 10/2013 | Brilmyer | |
| 8,562,520 B2 | 10/2013 | Rockrohr | |
| 8,573,002 B2 | 11/2013 | Ledoux et al. | |
| 8,590,724 B2 | 11/2013 | Kreidler et al. | |
| 8,596,485 B2 | 12/2013 | Lindsay | |
| 8,622,235 B2 | 1/2014 | Suchecki | |
| 8,622,279 B2 | 1/2014 | Barnett | |
| 8,678,024 B2 | 3/2014 | Freiler | |
| 8,701,928 B2 | 4/2014 | Samson | |
| D707,100 S | 6/2014 | Kinskey et al. | |
| 8,740,010 B1 | 6/2014 | Page | |

(56) References Cited

U.S. PATENT DOCUMENTS

| | | |
|---|---|---|
| 8,746,498 B2 | 6/2014 | Maldonado et al. |
| 8,794,469 B2 | 8/2014 | Bratsch |
| 8,887,515 B2 | 11/2014 | Patstone |
| 8,939,315 B2 | 1/2015 | Pillow et al. |
| 8,944,476 B1 | 2/2015 | Henderson |
| 8,967,419 B2 | 3/2015 | Gerber et al. |
| 8,979,073 B2 | 3/2015 | Lykins et al. |
| 8,979,144 B2 | 3/2015 | Paugh et al. |
| 9,027,722 B1 | 5/2015 | Parker |
| 9,052,025 B2 | 6/2015 | Zinn et al. |
| 9,091,477 B2 | 7/2015 | Magnus |
| D739,302 S | 9/2015 | Nilsen et al. |
| 9,126,747 B2 | 9/2015 | Burgess et al. |
| 9,132,598 B2 | 9/2015 | Ernst |
| 9,139,352 B2 | 9/2015 | Seiders et al. |
| 9,140,476 B2 | 9/2015 | Eckhoff et al. |
| 9,163,871 B1 | 10/2015 | Costello |
| D744,810 S | 12/2015 | Pittman |
| 9,199,782 B1 | 12/2015 | Cliatt |
| D747,950 S | 1/2016 | Jacobsen et al. |
| D747,951 S | 1/2016 | Jacobsen et al. |
| D748,452 S | 2/2016 | Jacobsen et al. |
| 9,260,129 B2 | 2/2016 | Thompson |
| 9,265,318 B1 | 2/2016 | Williams et al. |
| D750,953 S | 3/2016 | Jacobsen et al. |
| 9,271,553 B2 | 3/2016 | Ponx |
| 9,271,595 B2 | 3/2016 | Lee |
| 9,278,704 B2 | 3/2016 | Cates |
| 9,282,797 B1 | 3/2016 | Soto |
| 9,296,543 B2 | 3/2016 | Wooldridge et al. |
| 9,310,118 B2 | 4/2016 | Zavitsanos |
| 9,320,938 B1 | 4/2016 | Belmore |
| 9,341,275 B2 | 5/2016 | Peck et al. |
| D759,590 S | 6/2016 | Wang |
| 9,389,010 B1 | 7/2016 | Booker, Sr. |
| 9,414,893 B2 | 8/2016 | Jacobson |
| 9,415,787 B2 | 8/2016 | Mericle |
| 9,462,796 B1 | 10/2016 | Ellis et al. |
| 9,550,508 B1 | 1/2017 | Parra |
| 9,578,938 B1 | 2/2017 | Vemeuille |
| 9,616,910 B2 | 4/2017 | Chaloux et al. |
| 9,648,990 B1* | 5/2017 | Corney ............... A47K 5/1211 |
| 9,668,510 B2 | 6/2017 | Doman |
| 9,669,986 B1 | 6/2017 | Evans |
| 9,676,522 B1 | 6/2017 | Stovall |
| 9,718,070 B2 | 8/2017 | Arminak et al. |
| 9,726,415 B1 | 8/2017 | Spalti |
| 9,738,296 B2 | 8/2017 | McBeth |
| 9,809,357 B2 | 11/2017 | Arnold et al. |
| 9,849,901 B2 | 12/2017 | Jackman |
| 9,857,119 B2 | 1/2018 | Keenan |
| 9,878,841 B2 | 1/2018 | Holderness et al. |
| 9,888,977 B2 | 2/2018 | Thomas et al. |
| 9,956,978 B1 | 5/2018 | Worley |
| 9,976,789 B2 | 5/2018 | Grepper |
| D820,049 S | 6/2018 | Ahlstrom et al. |
| 9,989,299 B1 | 6/2018 | Ballard |
| D826,027 S | 8/2018 | Carey et al. |
| D844,386 S | 4/2019 | Ahlstrom et al. |
| 2003/0111476 A1 | 6/2003 | Serio |
| 2003/0136702 A1 | 7/2003 | Redzisz et al. |
| 2004/0025531 A1 | 2/2004 | Holloman-Hughes et al. |
| 2004/0144783 A1 | 7/2004 | Anderson et al. |
| 2004/0182870 A1 | 9/2004 | Rodgers |
| 2004/0262319 A1 | 12/2004 | Fisher |
| 2005/0082305 A1 | 4/2005 | Dais et al. |
| 2005/0269541 A1 | 12/2005 | Bodum |
| 2005/0279124 A1 | 12/2005 | Maldonado |
| 2006/0017293 A1 | 1/2006 | Tonelli |
| 2006/0042897 A1* | 3/2006 | Sanderson ......... A45C 13/1084 190/120 |
| 2006/0276768 A1 | 12/2006 | Miller et al. |
| 2007/0284377 A1 | 12/2007 | Chandler |
| 2008/0134714 A1 | 6/2008 | Villanueva |
| 2008/0145919 A1 | 6/2008 | Franklin et al. |
| 2008/0164265 A1 | 7/2008 | Conforti |
| 2008/0178629 A1 | 7/2008 | Meether |
| 2008/0190940 A1* | 8/2008 | Scott .................. A45C 9/00 220/592.2 |
| 2009/0114646 A1 | 5/2009 | Whalen |
| 2009/0158770 A1 | 6/2009 | Cohrs et al. |
| 2009/0188736 A1 | 7/2009 | Niddam et al. |
| 2009/0217699 A1 | 9/2009 | Ball |
| 2009/0274398 A1 | 11/2009 | Men |
| 2010/0126196 A1 | 5/2010 | McCance |
| 2010/0200588 A1* | 8/2010 | Bergman ........... B65D 81/2038 220/203.01 |
| 2010/0212351 A1 | 8/2010 | Chapin et al. |
| 2010/0288776 A1 | 11/2010 | Bodum |
| 2011/0062157 A1 | 3/2011 | Grimm |
| 2011/0127264 A1 | 6/2011 | Whalen |
| 2011/0197625 A1 | 8/2011 | Urban et al. |
| 2011/0215125 A1 | 9/2011 | Lopez |
| 2011/0226785 A1 | 9/2011 | Sakell |
| 2012/0318808 A1 | 12/2012 | McCormick |
| 2013/0043250 A1* | 2/2013 | Kreidler .................. A61L 2/26 220/324 |
| 2014/0226920 A1 | 8/2014 | Passavia |
| 2014/0252010 A1 | 9/2014 | Miller |
| 2015/0008242 A1 | 1/2015 | Kpabar, Jr. |
| 2015/0047635 A1 | 2/2015 | Poree |
| 2015/0136796 A1 | 5/2015 | Muehlhauser |
| 2015/0300721 A1 | 10/2015 | Rigoli |
| 2015/0345853 A1 | 12/2015 | Oeyen |
| 2015/0375918 A1* | 12/2015 | Holderness ......... B67D 3/0067 222/566 |
| 2016/0031617 A1 | 2/2016 | Faucheaux, Jr. et al. |
| 2016/0073751 A1 | 3/2016 | Charlebois et al. |
| 2016/0113131 A1 | 4/2016 | Emesti et al. |
| 2016/0135559 A1 | 5/2016 | Scally |
| 2016/0244239 A1 | 8/2016 | Nash |
| 2017/0020256 A1 | 1/2017 | Jankura et al. |
| 2017/0055665 A1 | 3/2017 | Lanzisera |
| 2017/0101301 A1 | 4/2017 | Volin |
| 2017/0156525 A1 | 6/2017 | Guy |
| 2017/0159989 A1 | 6/2017 | Bodnar |
| 2017/0197765 A1* | 7/2017 | Hu ........................ B25H 3/02 |
| 2017/0254578 A1 | 9/2017 | Kriesel |
| 2017/0259956 A1 | 9/2017 | Hori et al. |
| 2017/0292756 A1 | 10/2017 | Fenko et al. |
| 2017/0305638 A1 | 10/2017 | Sonntag et al. |
| 2017/0313492 A1 | 11/2017 | Seiders et al. |
| 2017/0320653 A1 | 11/2017 | Mogil et al. |
| 2017/0343247 A1 | 11/2017 | Ahmad et al. |
| 2018/0003425 A1 | 1/2018 | Goodloe |
| 2018/0015938 A1* | 1/2018 | DeFrancia ............. A45C 13/02 |
| 2018/0016068 A1 | 1/2018 | Valencia |
| 2018/0087819 A1 | 3/2018 | Triska et al. |
| 2018/0127007 A1 | 5/2018 | Kravchenko |
| 2018/0132586 A1 | 5/2018 | Flaherty |
| 2018/0141718 A1 | 5/2018 | Ahlstrom et al. |
| 2018/0354687 A1* | 12/2018 | Seiders ............... B65D 25/2841 |
| 2019/0048631 A1* | 2/2019 | Li ............................ E05C 19/12 |
| 2019/0152677 A1* | 5/2019 | Hoyt .................. B65D 25/2885 |
| 2019/0161240 A1 | 5/2019 | Ahlstrom et al. |
| 2019/0217999 A1* | 7/2019 | Wood .................... B65D 43/22 |
| 2019/0315538 A1* | 10/2019 | Cheng ................. B65D 43/022 |

FOREIGN PATENT DOCUMENTS

| | | |
|---|---|---|
| CN | 304286831 | 9/2017 |
| DE | 8229359 U1 | 12/1982 |
| DE | 102010054187 A1 | 6/2012 |
| EP | 1700551 A2 | 9/2006 |
| EP | 2135816 A1 | 12/2009 |
| EP | 2852505 A1 | 4/2015 |
| EP | 2861899 A1 | 4/2015 |
| GB | 2045135 A | 2/1996 |
| GB | 2095684 | 11/2000 |
| GB | 2096851 | 1/2001 |
| GB | 3005022 | 1/2003 |
| GB | 3025672 | 12/2006 |
| WO | 9821534 A1 | 5/1998 |

(56) References Cited

FOREIGN PATENT DOCUMENTS

| WO | 2006007266 A2 | 1/2006 |
| WO | 14074113 A1 | 5/2014 |
| WO | 2016066817 A1 | 5/2016 |
| WO | 17072531 A1 | 5/2017 |
| WO | 17182290 A1 | 10/2017 |
| WO | 18005859 A2 | 1/2018 |

OTHER PUBLICATIONS

Dometic Patrol 35 https://shop.dometic.com/store/dometic/en_US/pd/productID.5178771400 (12 pp) Oct. 23, 2019.

* cited by examiner

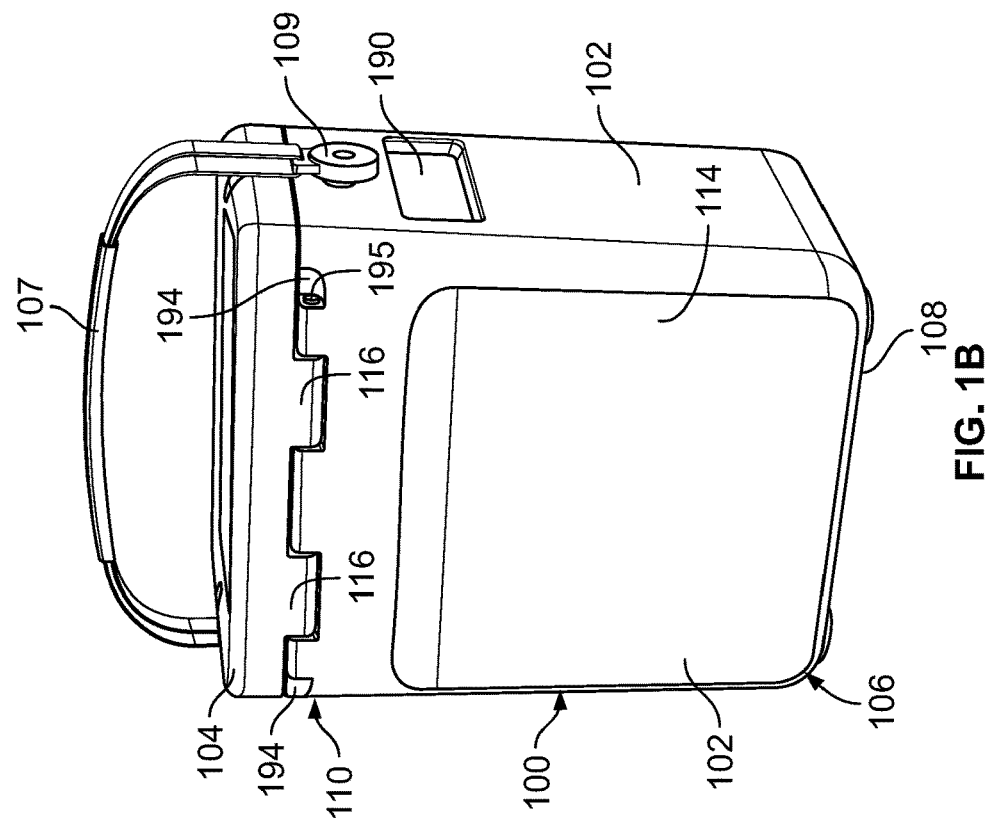
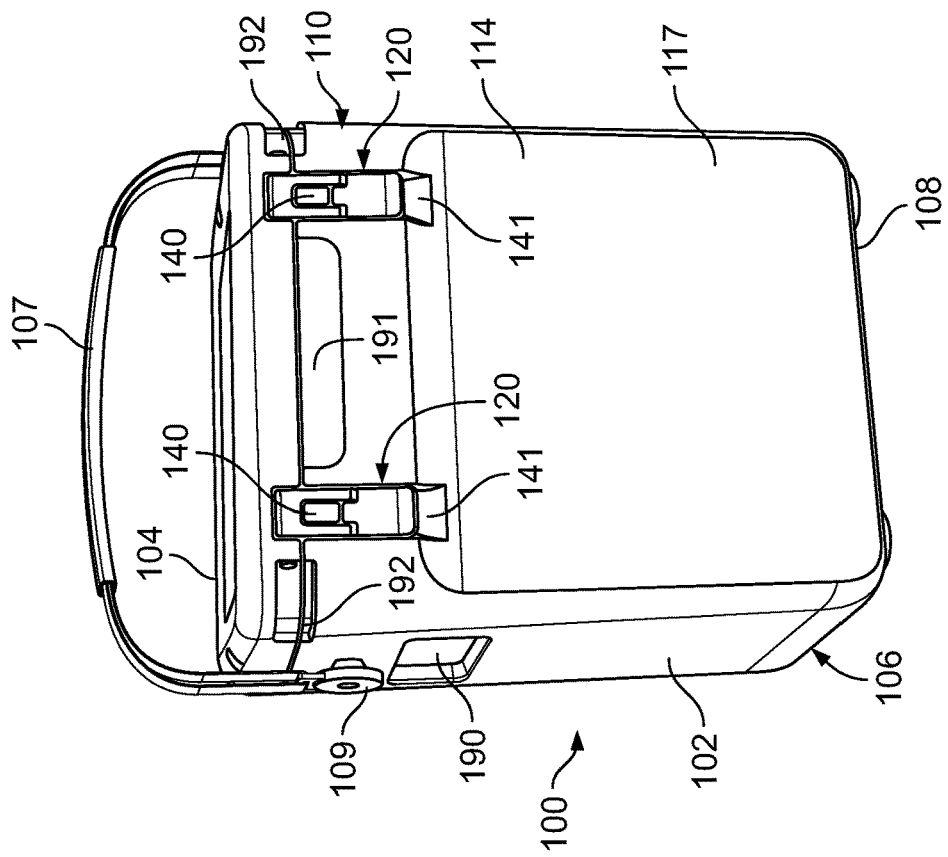

INSULATING CONTAINER

BACKGROUND

Various types of containers are often used to store food or other items. In some examples, it may be advantageous to maintain a temperature of the contents being stored in the container. Accordingly, an insulating container may be used. However, certain conventional insulating containers are often not very durable and lack an adequate means to secure the lid in a closed position. For instance, they have lids that may be lost or broken, handles that may protrude from a base portion of the container, and/or ineffective latches used to secure the lid. In these examples, the lid, handle, and/or the latches may be susceptible to breakage, which, in some cases, may render the insulating container virtually useless.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Insulating containers have various features are described herein. In some examples, the insulating containers may include a base or bottom portion formed by a plurality of sides and a lid. The lid may secure an opening formed by one end of each of the plurality of sides forming the base. The opening may be configured to provide access to an interior void of the insulating container that may also be formed by the sidewall structure or plurality of sides and the bottom portion. The lid may be rotatable about a hinge or hinges from a closed position or configuration to an open configuration. The lid may also include a gasket configured to seal the opening and configured to provide a watertight seal when the lid is in the closed and secured configuration. In some examples, the insulating container may include at least one latching device. The latching device may have a portion arranged on the lid and a portion arranged on the base or bottom portion and may be configured to secure the lid in the closed configuration. The latch may also include a latch upper that may be pivotally attached to the lid, and a latch lower that may be pivotally attached to the latch upper. The latch lower may also include an engaging tab configured to engage a keeper on the insulating container when the lid is secured in the closed configuration. The keeper may also be located on the front side of the base or bottom portion of the insulating container. The latch device may be substantially rectangular shaped when the lid is secured in the closed configuration. In some examples, the latching device may include a portion comprising an elastomeric material and another portion comprising rigid and elastomeric materials. In some examples, the latch lower is more rigid than the latch upper. In other examples, the engaging tab of the latch lower is a rigid material and the remainder of the latch lower is an elastomeric material. In another example, when the lid is in a secured and closed position, a portion of the latching device is tensioned.

In some examples, the latch upper and the latch lower may be configured in a recessed position and flush with the front side of the lid and flush with the front side of the bottom portion of the insulating container when the latch device secures the lid in a closed configuration. The keeper may also be configured to be flush with the latch upper and the latch lower when the latch device secures the lid in a closed configuration. In other examples, the latch upper may include a base, a first arm, and a second arm. The first arm and the second arm may be substantially perpendicular to the base, and the first arm and the second arm may be substantially parallel to each other. In such a configuration, the latch upper may be a substantially inverted U-shape. In another example, the latch lower engaging tab may be located between the first arm and the second arm of the latch upper when the latch lower is pivotally secured to the latch upper. In still other examples, the insulating container may include a pressure regulation device configured to passively allow regulation or equalization of the pressure between the interior void and the atmosphere to prevent lid lock. In yet other examples, the pressure regulation device may include a duckbill-umbrella valve.

In some examples, the insulating container may include a plurality of latching devices. The latching device may include a latch upper pivotally secured to the insulating container lid by a latch upper pin. In certain examples, the latch upper is constructed of an elastomeric rubber. In other examples, the latch lower may be constructed of a rigid plastic and elastomeric rubber. In yet other examples, the latch lower may be pivotally secured to the latch upper by a latch lower pin. In another example, the latch lower may include an engaging tab configured to engage a groove or slot configured in the bottom side of a keeper when the latch device secures the lid in a closed configuration. In another example, the latch lower may also include a finger lift in a position directly opposite the engaging tab. In yet another example, the finger lift extends away or distally from the insulating container lid. In some examples, In the latch upper may include a base, a first arm, and a second arm. The first arm and the second arm may be substantially perpendicular to the base, and the first arm and the second arm may be substantially parallel to each other. The latch upper may be a substantially inverted U-shape and the latch lower engaging tab may be configured to pivot or rotate between the first arm and the second arm of the latch upper when the latch lower is secured to the latch upper.

These and various other features will be described more fully herein.

BRIEF DESCRIPTION OF THE DRAWINGS

The present invention is illustrated by way of example and not limited in the accompanying figures in which like reference numerals indicate similar elements and in which:

FIGS. 1A and 1B are front and rear perspective views, respectively, of an insulating container according to one or more aspects described herein.

Further, it is to be understood that the drawings may represent the scale of different components of one single embodiment; however, the disclosed embodiments are not limited to that particular scale.

DETAILED DESCRIPTION

Aspects of this disclosure relate to an insulating container configured to store contents or a volume of liquid. In some examples, the insulating container may include a lid lockable or securable with at least one latch or at least one latching device, and the lid may be hinged to allow the lid to rotate from a closed position to an open position that is approximately 115° from the closed position, and/or be non-destructively removable (e.g., able to be removed and replaced) from a base portion of the insulating container. Additionally or alternatively, the insulating container may include a pressure regulation device that aids in venting the insulating container to prevent lid lock due to pressure or temperature changes. Additionally or alternatively, the insulating container may have handles that are integrally formed in the base portion of the insulating container. These and various other features and aspects of the insulating container will be described more fully herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure.

FIGS. 1A and 1B depict perspective views of an insulting container 100. In one example, the insulting container 100 may comprise a base portion 102 and a lid 104 that, in some examples, may be non-destructively, removably coupled thereto. The base portion 102 may be an insulated structure forming an interior void for containing contents or a liquid, as will be discussed more fully herein. In some examples, the base portion 102 may be cuboidal or substantially cuboidal in shape. In still other examples, the base portion 102 may be substantially cylindrical in shape or may have a substantially rectangular cross section. Various other shapes may be used without departing from the invention.

Figure 2A:
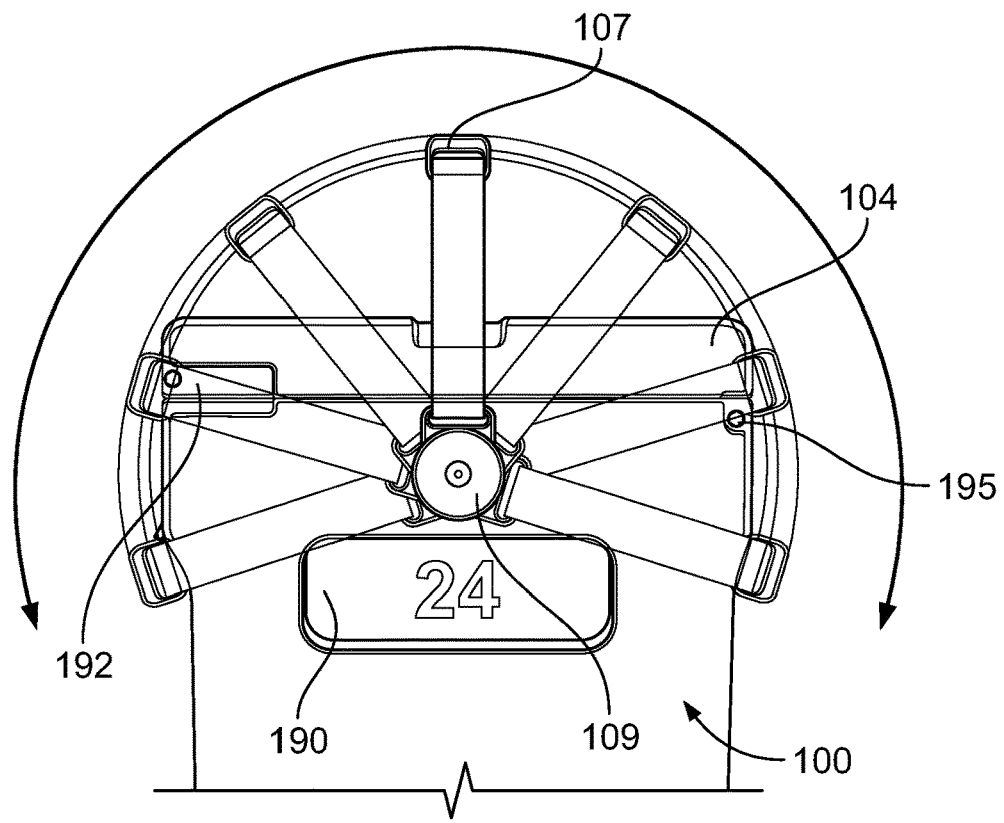
FIG. 2A illustrates a side view of the insulating container of FIGS. 1A and 1B highlighting the carry strap or carry handle arrangement in which a strap or handle may be rotated from one side of the insulating container to the other via handle pivots according to one or more aspects described herein.
Figure 2B:
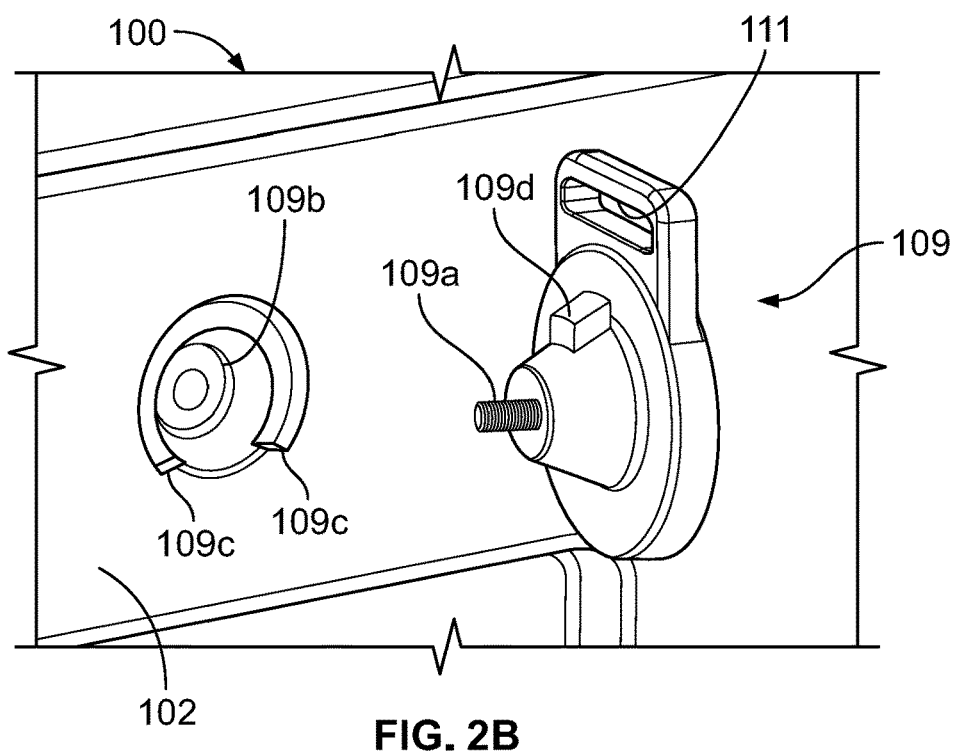
FIG. 2B is a deconstructed view of the handle pivot of FIG. 2A according to one or more aspects described herein.

The base portion 102 may include a first end 106, having a bottom surface 108. The bottom surface 108 may be configured to support the insulating container on a surface, such as a table, the ground, a vehicle bed, boat deck, or the like. The base portion 102 may also include carry handle or carry strap 107. Carry handle or strap 107 may be connected to handle pivot 109. In certain examples, the insulating container is configured with a plurality of handle pivots 109. Each end of the handle or carry strap 107 may be attached to a handle pivot 109 allowing the handle or carry strap 107 to freely rotate from the front of the insulating container to the rear of the insulating container. As shown in FIG. 2A, handle 107 engages handle pivot 109. Handle pivot 109 is configured to rotate approximately 240° and allows the handle 107 to be rotated from the front of insulating container 100 to the rear of the insulating container 100. In another example, the handle 107 engages handle pivot 109 and is configured to travel in an arc over the lid 107. In other examples, the handle pivot 109 is configured to travel at least 220°, 225°, 230°, 235°, 240°, 245°, or 250°. In other examples, the handle pivot 109 is configured to travel from about 220° to 240° of travel. In certain examples, as shown in FIG. 2B, an insert 109b is integrally molded in the base portion 102. The handle pivot 109 is configured to engage the insert 109b. Insert 109b further includes stops 109c that are configured to engage a protrusion 109d on the handle pivot 109. The movement of the handle 107 is limited by the engagement of the protrusion 109d with the stops 109c. In some examples, handle pivot 109 is secured to the base portion 102 and insert 109b by pivot hardware 109a. In certain examples, pivot hardware 109a may be a screw, bolt, rivet, etc. In other examples, handle pivot 109 further includes a strap loop 111 configured to allow attachment of a carry strap or handle 107 to the handle pivot 109. In some examples, the handle or carry strap 107 may be formed of various suitable materials, such as one or more plastics. For instance, the handle 107 may have a core formed of polyvinyl chloride and an outer portion formed of ethylene vinyl acetate. In other examples, the handle or carry strap 107 may be formed of rope (such as polyester rope), or a nylon webbing. In yet other examples, the handle or carry strap 107 may be constructed of various materials, such as one or more metals, alloys, polymers, ceramics, or fiber-reinforced materials. In still other examples, the handle or carry strap 107 may include padding to facilitate easier carrying via the shoulder or by hand.

Figure 2C:
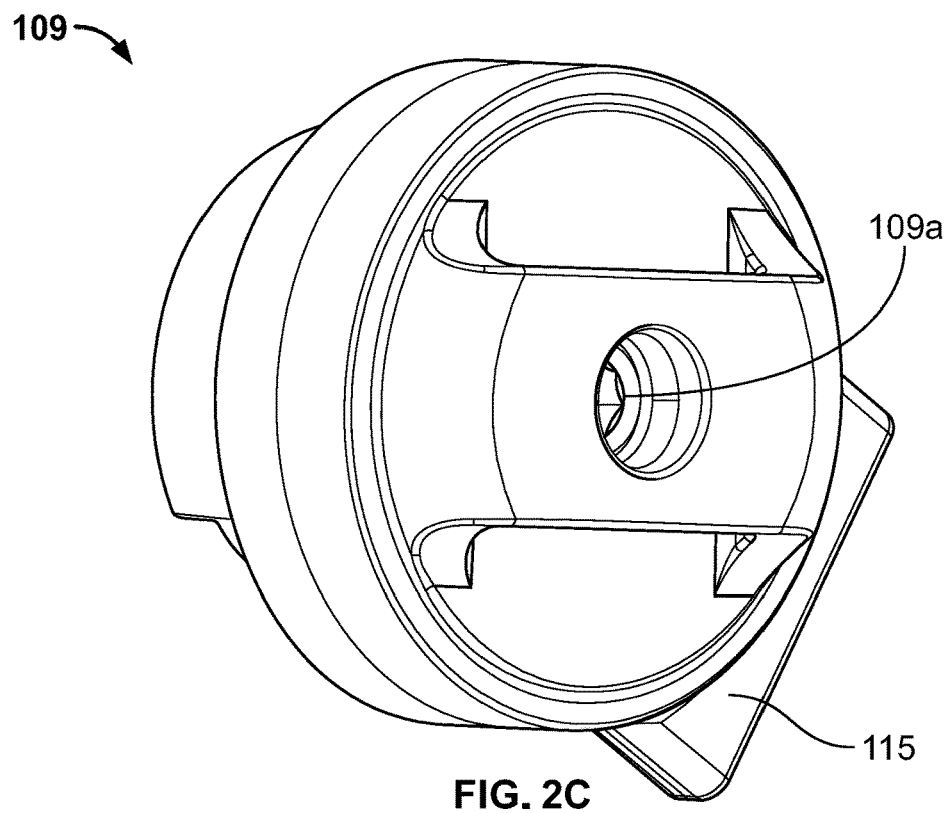
FIG. 2C is an expanded front perspective view of another example handle pivot according to one or more aspects described herein.
Figure 2D:
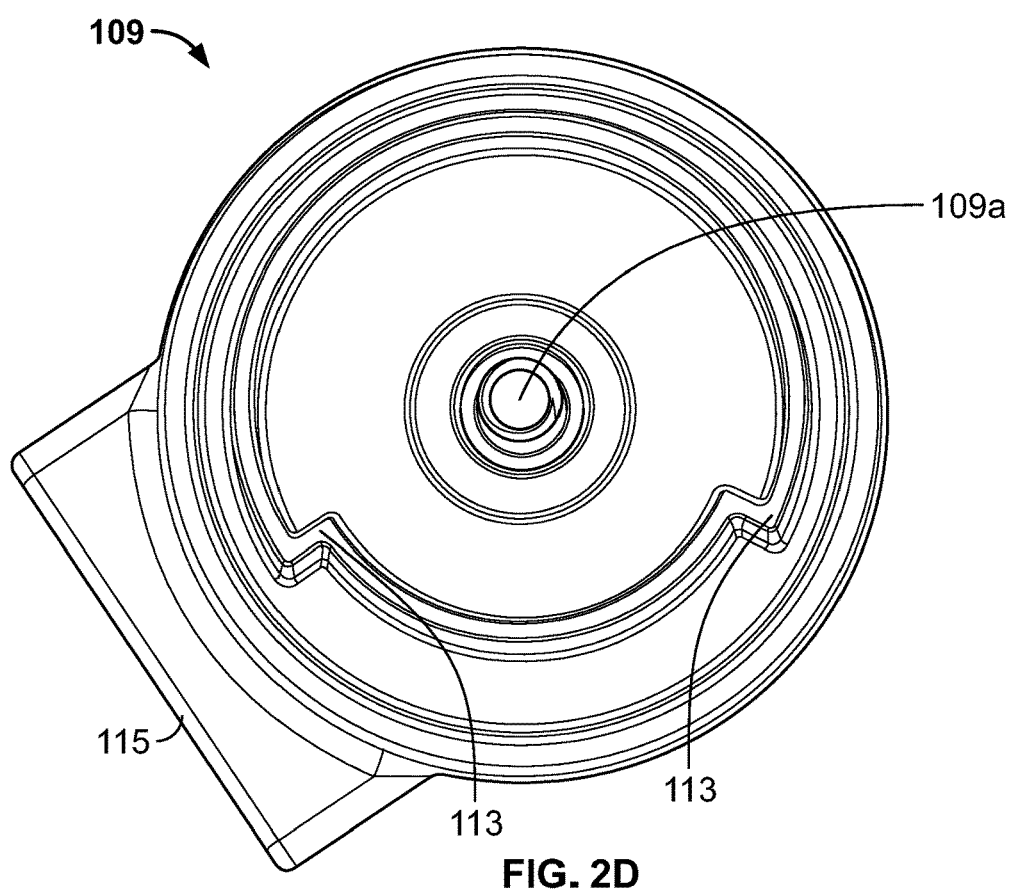
FIG. 2D is a rear perspective view the handle pivot shown in FIG. 2C according to one or more aspects described herein.

FIGS. 2C and 2D illustrate another example handle pivot 109. Handle pivot 109 may include a handle or carry strap 107 attachment point 115. In other examples, as shown in FIG. 2D, the handle pivot 109 may include a first and second stop 113. Stops 113 are configured to engage at least one or a plurality of stops 109c or a protrusion (not shown) when the handle pivot 109 engages the insert 109b. The configuration and geometry of the insert 109b and the handle pivot 109 may prevent the carry strap or handle 107 from rotating under the insulating container 100.

The base portion 102 further includes a second end 110 defining an opening 112 (shown in FIG. 5A) that may be used to access the interior void of the insulating container. The opening 112 may be covered by lid 104, when the insulting container is in use (e.g., when the insulating container is in a closed configuration). The base portion 102 may further include a plurality of side portions 114 connected to the bottom surface that define a void for receiving contents in the insulating container 102. The side portions 114 may be arranged such that they extend generally perpendicularly from the bottom surface 108.

In some examples, one or more side pocket handles 190 may be arranged in one or more side portions 114 (or other region of the base portion 102). The side pocket handles may be integrally molded with the base portion 102 and may generally be an undercut or cutout formed in the side portion 114 of the base 102. In some examples, such as shown in FIGS. 1A and 1B, the undercut or cutout forming the side pocket handle may include a recess extending along substantially all or a majority of the side portion 114. This may provide ease of manufacturing the base 102 with the integrally molded handles 190. In some examples, the side pocket handles 190 may be flush with an exterior surface of the base 102 in order to reduce the risk of breakage.

As discussed above, the insulating container 100 may be configured to contain, store, carry, etc., a volume of contents or possibly a liquid. In some examples, the insulting container 100 may be configured to store between twenty-two (22) and twenty-eight (28) quarts of contents. In some examples, the insulating container may be configured to store approximately twenty-four (24) quarts of contents. In other examples, the insulating container may be configured to store at least twenty-two (22) quarts of contents, or the insulating container may be configured to store at least twenty-eight (28) quarts of contents, among others. In yet other examples, the insulating container may be configured to store approximately sixteen (16) quarts of contents, twenty-four (24) quarts of contents, thirty-six (36) to thirty-eight (38) quarts of contents, or forty-eight (48) to fifty-eight (58) quarts of contents. In still other examples, the insulting container 100 may be configured to store between about fourteen (14) and about forty-five twenty-eight (45) quarts of contents. Additionally or alternatively, the insulating container 100 may be configured to store materials in a solid, liquid, or a gaseous state, or combinations thereof, without departing from the scope of the disclosure described herein.

In at least some examples, the insulating container 100 (and various other containers described herein) may be sized to accommodate the volume of contents described above. For example, the insulating container 100 may be at least seventeen (17) inches tall, at least sixteen (16) inches wide, and at least fourteen (14) inches deep. Additionally or alternatively, the insulating container 100 may be configured in different sizes (i.e., height, width, and depth) without departing from the scope of the disclosure described herein.

As previously discussed, the insulating container 100 includes a lid 104. In some examples, the lid 104 may connect to the base 102 in a closed configuration using a press fit. Additionally or alternatively, other securing systems or devices may be used to secure the lid 104 to the base. Insulating container 100 may include latching devices 120 and keepers 140 of the base 102 on the front of the container, as shown in FIG. 1A, to secure the lid 104 in the closed position. In some examples, the insulating container 100 includes at least one or a plurality of latch slots 141 integrally molded at the top of base 102. The latch slots 141 may be configured to provide a recess sized appropriately to accommodate the latch 120 in such a manner that the latch 120 is flush with the latch slot 141 when the lid 104 is in a closed and secured configuration. In other examples, the latch 120 is flush with the latch slot 141 and the keeper 140 when the lid 104 is in a closed and secured configuration. In other configurations, insulating container 100 may include a lid 104 and base 102 that form at least one corner lift ledge 192 to facilitate easy gripping of the lid for opening. In other examples, the insulating container may include a plurality of corner lift ledges 192. In certain examples, the lift ledge 192 may be formed by an integrally molded portion of the corner of the lid 104, and an integrally molded portion of the front corner at the top of the base 102. In still other configurations, insulating container 100 may include front lift ledge 191 integrally molded in the base 102. The front lift ledge 191 may integrally molded at the top of the base 102. The lift ledge is configured to provide the insulating container an easily accessible region to allow an individual to grasp the lid 104 for ease of opening (i.e., one handed operation).

In some examples, the lid 104 may be hinged such that it is connected to (either removably or permanently) the base 102 at a hinge 116 and may be rotated about the hinge 116. The hinge may be one of various types of hinges, including a continuous piano hinge, double hinge, ball joint hinge, living hinge, and the like. The hinge 116 may permit the lid 104 to be opened and rotated away from the base portion 102, to allow access to the internal void defined by the base portion 102 (e.g., via opening 112). That is, the hinge may facilitate rotation of the lid 104 from a closed configuration of the insulating container (e.g., when the lid is in place covering the internal void formed by the base) to an open configuration (e.g., when the lid is not covering the internal void formed by the base), and vice versa. In some examples, the insulating container 100 is configured with at least one hinge 116. In another example, the insulating container is configured with a plurality of hinges. In still other configurations, hinge 116 comprises a first portion integrally molded in the lid 104 and a second portion integrally molded in the base 102. In yet other examples, the hinge 116 may further include at least one pin pocket 194 or a plurality of pin pockets 194 to secure the lid 104 to the base 102 via at least one hinge pin 195 thus allowing the lid to rotate from a closed position to an open position. In other examples, a plurality of hinge pins 195 secure the lid 104 to the base 102.

Figure 1C:
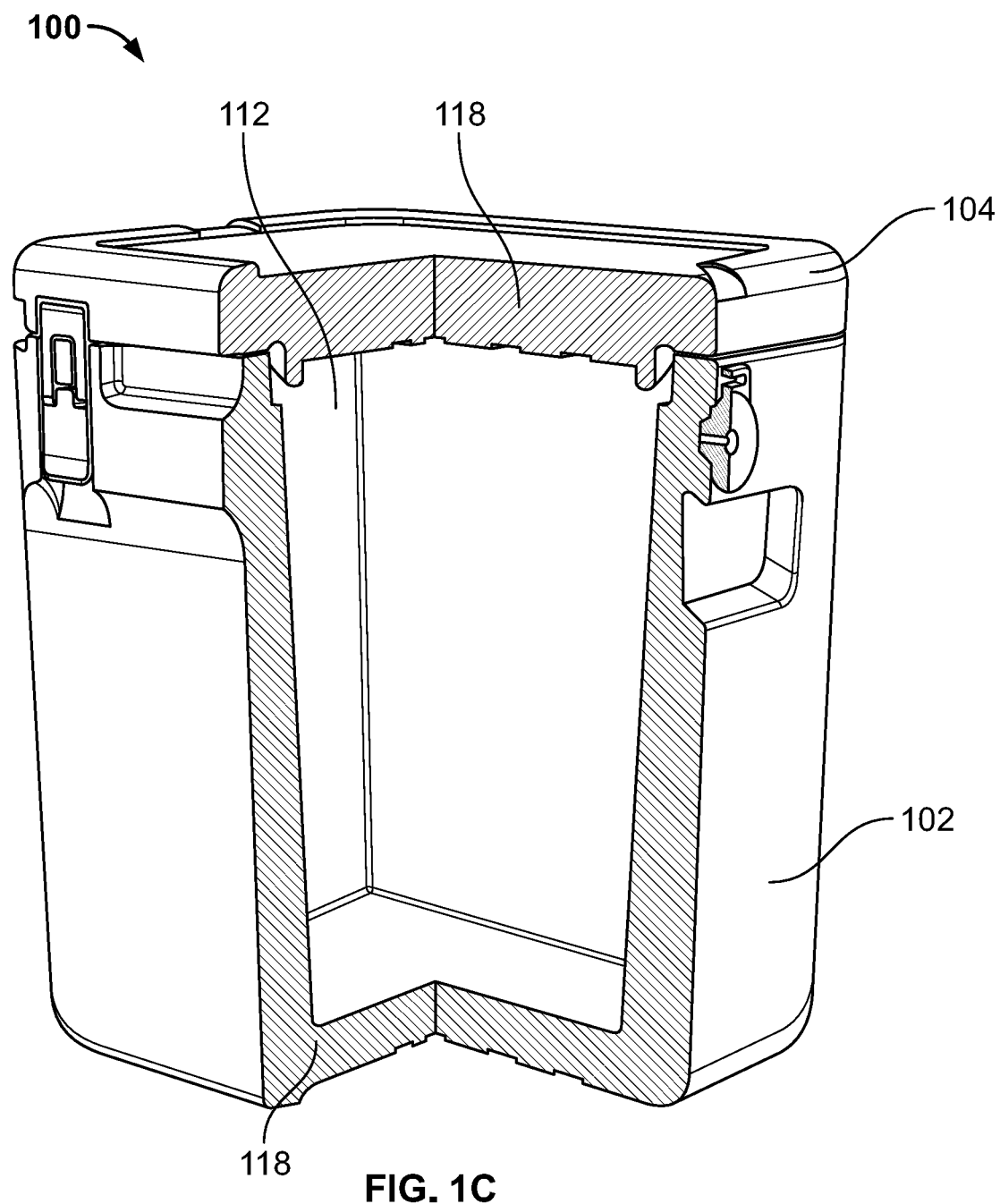
FIG. 1C is a front perspective, internal cross-sectional view of the insulating container depicted in FIGS. 1A and 1B.
Figure 5A:
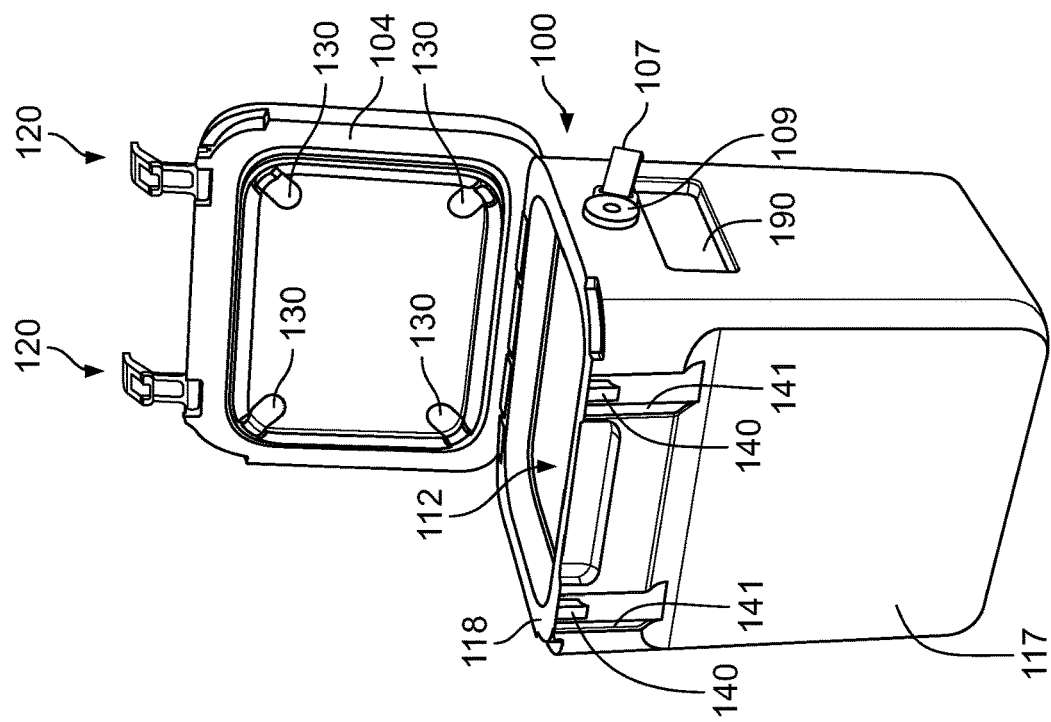
FIG. 5A illustrates one hinge arrangement in which a lid may be rotated from a closed configuration to an open configuration according to one or more aspects described herein.

In the examples described herein, base 102 and lid 104 may include an exterior surface or outer shell 117 surrounding and enclosing an insulating portion 118, as shown in FIGS. 1C and 5A. The shell 117 is typically formed from various materials, such as one or more metals, alloys, polymers, ceramics, or fiber-reinforced materials. In some examples, the shell 117 may be formed of a plastic material, such as polyethylene, that is molded to form both the base 102 and lid 104 portions. In some examples, the insulating portion 118 is formed of an insulating material that exhibits low thermal conductivity. For instance, the insulating portion 118 may be formed of (or filled with) a polymer foam, such as polyurethane foam. Additional or other insulating materials may be used without departing from the invention. In some examples, the base 102 and lid 104 portions are formed using a roto-molded process as would be understood by one of ordinary skill in the art (not shown). However, various other types of molding or other manufacturing processes (e.g., stamping, casting, forging, and the like) may be used to form the insulating container without departing from the invention.

Figure 3A:
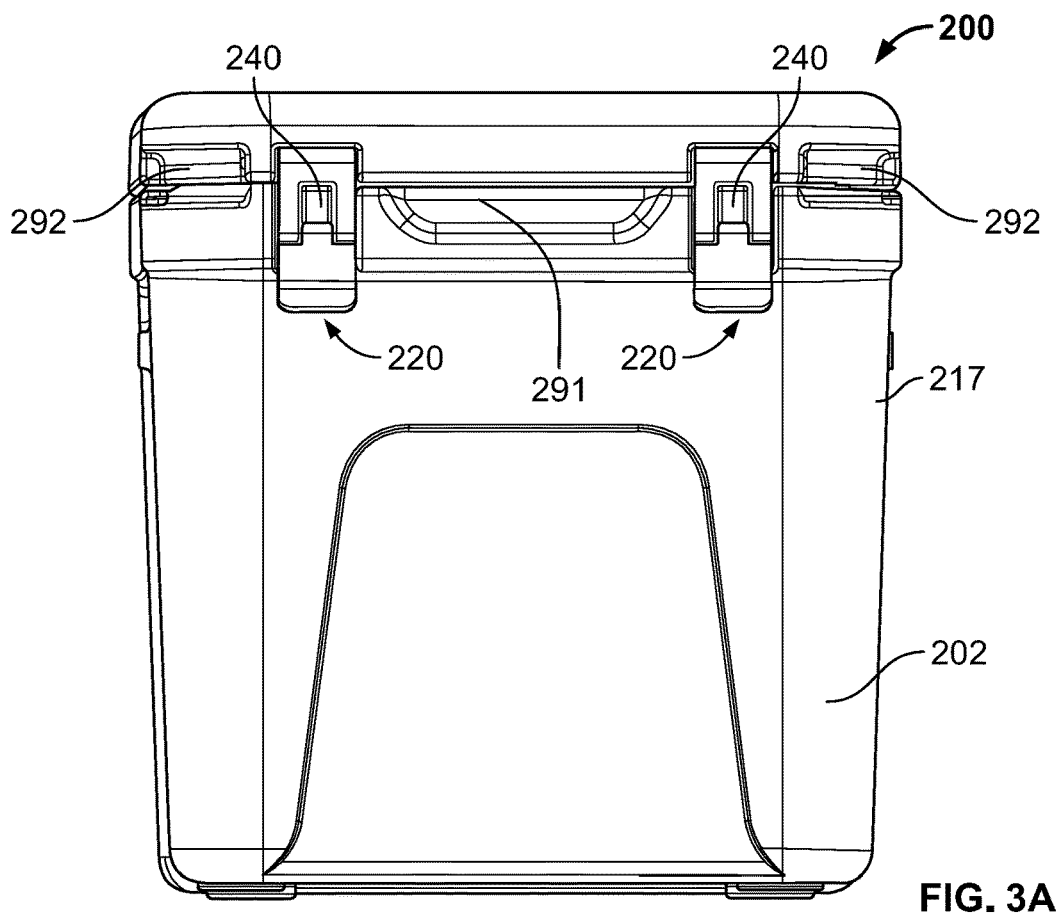
FIG. 3A is a front view of another example insulating container according to one or more aspects described herein.
Figure 3B:
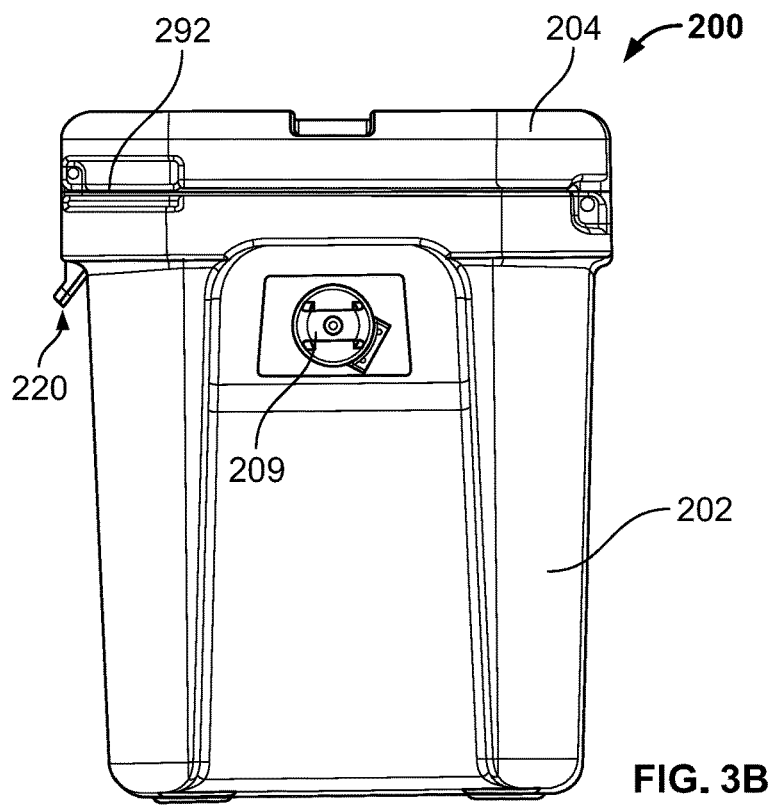
FIG. 3B is a side view of another example insulating container according to one or more aspects described herein.
Figure 3C:
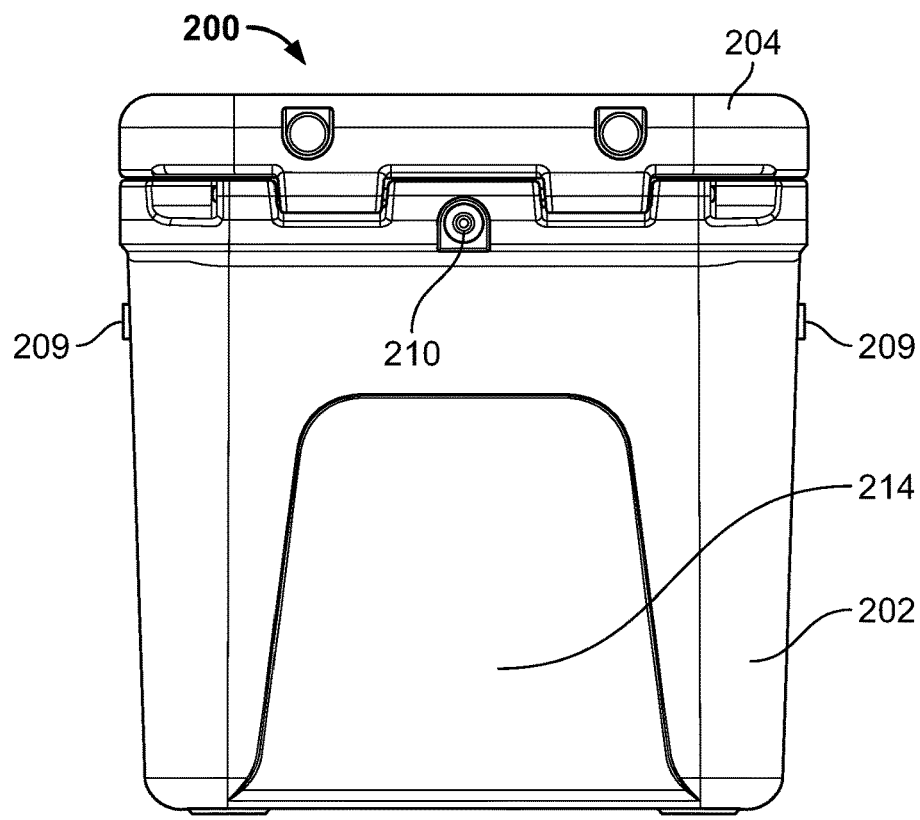
FIG. 3C is a rear view of another example insulating container according to one or more aspects described herein.

In other embodiments, as illustrated in FIGS. 3A-3C, the insulating container 200 includes latching devices 220 similar to those discussed with respect to FIGS. 1A and 1B. That is, the latching devices include keepers 240 of the base 202 on the front of the container 200 (e.g., similar to keepers 140 on container 100, as shown in FIG. 1A, including latching devices 120 to secure the lid 104 in the closed position). Accordingly, when the lid 204 is in the fully closed position, the engaging portion of a latch (not shown) will be received in and engaged with keepers 240 formed on the front of the insulating container 200 (as shown in FIG. 3A). In other configurations, insulating container 200 may include a lid 204 and base 202 that form at least one integrally molded corner lift ledge 292 to facilitate easy gripping of the lid for opening. In still other configurations, insulating container 200 may include front lift ledge 291 integrally molded in the base 202.

Similar to the examples discussed above, the keepers 140 and 240 may be molded into the base 102 and 202 as shown in FIGS. 1A and 3A, respectively. A similar process to that described below may be used to engage/disengage the latch 220 with the keepers 240. In still other embodiments, the base portion 202 may also include carry handle or carry strap 207 (not shown). Carry handle or strap 207 may be connected to pivot 209. In still other embodiments, the insulating container may lack a carry handle or strap and pivots. In other embodiments, insulating container 200 may include pressure regulation device 210 arranged in a rear or back side 214 of the base 202, as shown in FIG. 3C. In yet other examples, the pressure regulation device 210 may be configured in the lid 204.

Figure 4A:
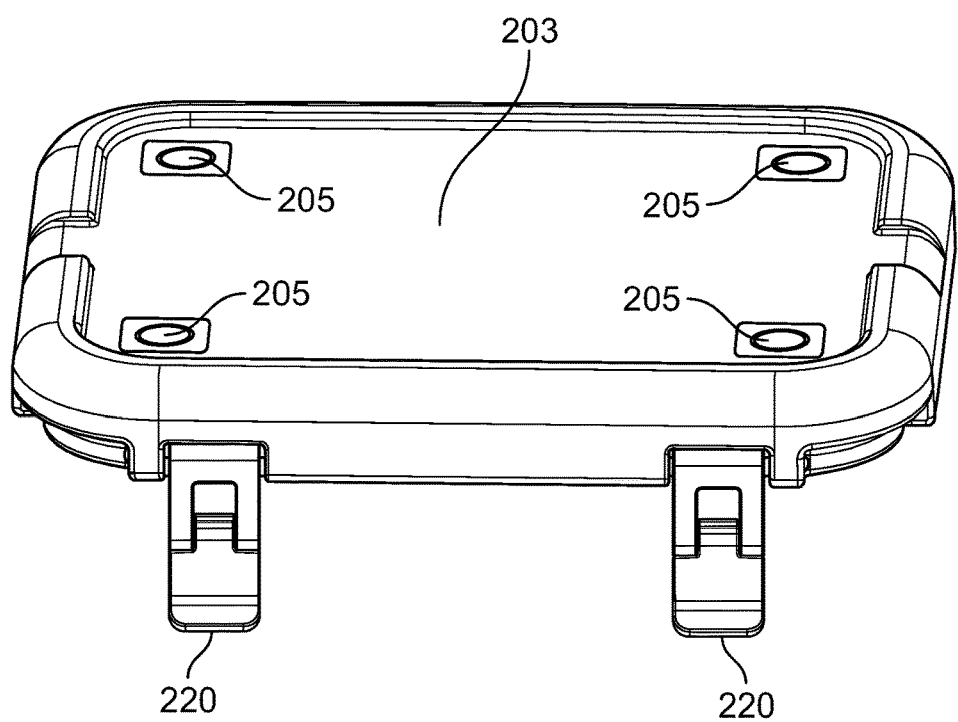
FIG. 4A is a top view front view of the insulating container lid of FIGS. 3A-3C according to one or more aspects described herein.
Figure 4B:
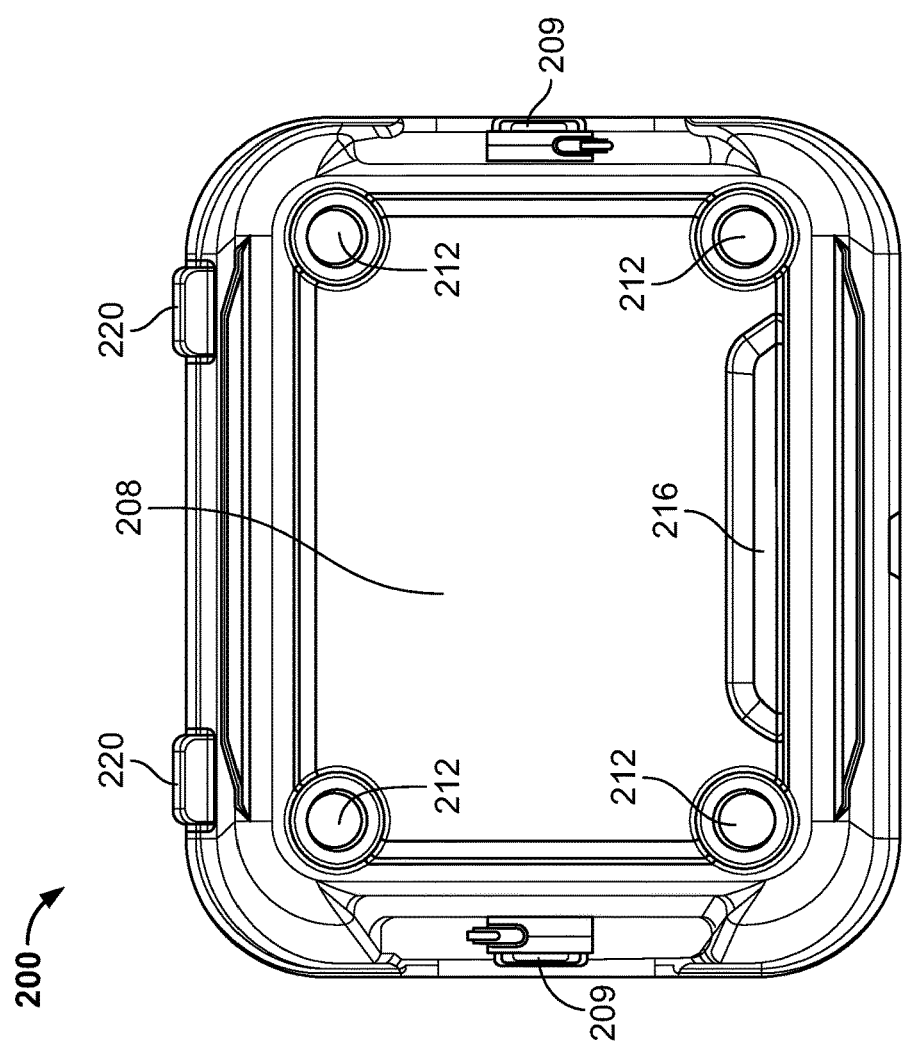
FIG. 4B is a bottom view front view of the insulating container of FIGS. 3A-3C according to one or more aspects described herein.

In other embodiments, the lid 204 of insulating container 200 may include a plurality of accessory magnets 205, as shown in FIG. 4A. The magnets 205 may be arranged on a top, exterior surface 203 of the lid 204. In some examples, the magnet may be substantially disc shaped or substantially ring shaped. In other examples, the magnets are configured to secure additional accessories to the top of the lid. In yet other examples, the magnet 205 is secured to the top of the lid via a press fit or adhesive. In another example, the magnet 205 is threaded and screwed into the lid 204. In still other examples, the magnet 205 is secured to the top of the lid by a fastener 205a (as shown in FIG. 10) such as a screw, bolt, rivet, or the like. Some example attachable and removable accessories may include a lid pack, a plastic or wooden cutting board, a seat cushion, or a lid net. The base portion 202 may include a first end 206, having a bottom surface 208. The bottom surface 208 may be configured to support the insulating container on a surface, such as a table, the ground, a vehicle bed, boat deck, or the like and may include a plurality of feet 212, as shown in FIG. 4B. Feet 212 may be configured to provide a non-skid or no-slip surface, and may be configured to keep the insulating container 200 elevated off the ground. In another example, feet 212 may be configured to reduce friction with the ground or surface so that the insulating container may be moved more easily while the container is on the ground (i.e., the insulating container may easily slide or be easily pushed across the ground). Feet 212 may be constructed of rubber, foam, plastic, or other suitable material. In still other embodiments, the bottom surface 208 may include a logo or name of a company or manufacturer of the insulating container embossed, integrally molded, or pressed into the exterior shell 217, as shown in FIG. 4B. In some embodiments, bottom pocket 216 may be integrally molded in the bottom surface 208 of the base portion 202. Bottom pocket 216 allows an individual to grasp the base portion 202 from the bottom surface 208 to facilitate easy emptying or dumping out the contents of the insulating container (e.g., ice, melted ice, water, etc.).

Figure 5C:
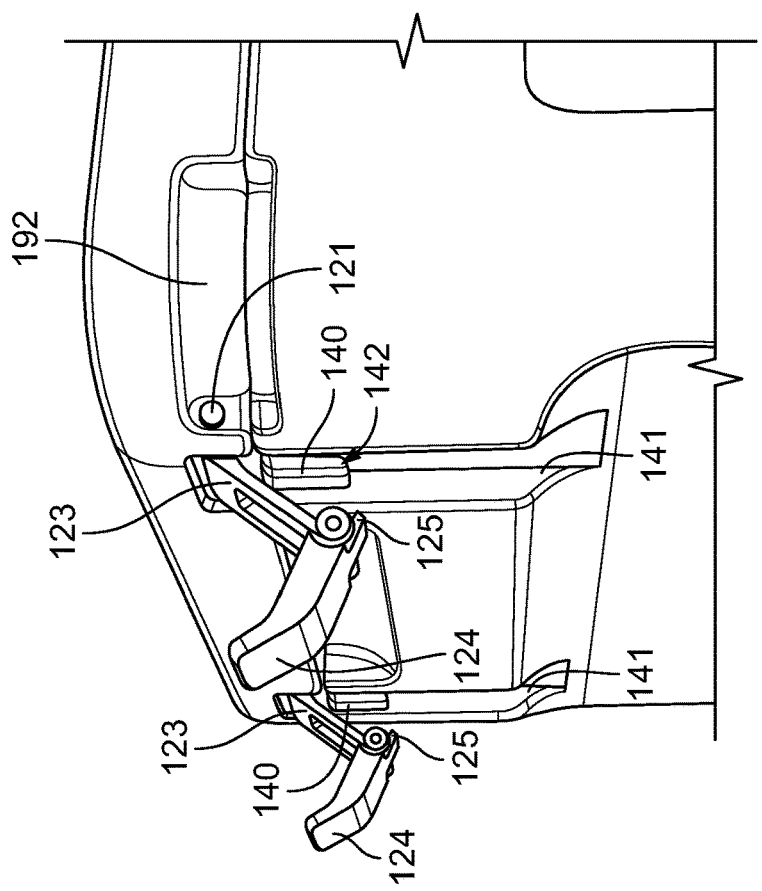
FIG. 5C is a perspective view of a low profile over center latching device or mechanism in the unsecured configuration according to one or more aspects described herein.

FIG. 5A illustrates the lid 104 of the insulating container 100 in a substantially open position. As shown in FIG. 5C, the lid 104 is in a substantially closed, but unsecured position. That is, the lid 104 is substantially perpendicular to the base 102 and is covering the opening. In order to open the lid 104, and thereby access the internal void defined by the base 102 of the insulating container 100, the lid 104 may be lifted upward, in the direction of the arrow shown in FIG. 5A. When the lid 104 is configured in the closed and secured position, the lid seals the opening 112. The lid is configured to travel approximately 115° from the fully closed to fully open position. In some examples, the lid is configured to travel at least 90°, 95°, 100°, 105°, 110°, 115°, or 120° from the fully closed to fully open position. In other examples, the lid 104 may be configured to travel from about 90° to 120° in the fully open position. In some examples, the lid remains upright when configured in the fully upright position. In still other examples, with further reference to FIGS. 1A, 1B, 3A-3C, and 5A, to open the lid 104 (e.g., to allow access to an interior void formed by the base 102), the hinged lid 104 may be rotated away from the base portion 102 and may rest along a rear side 114 of the base portion 102 (e.g., the lid may rotate at least 90° from a closed configuration (e.g., the position shown in FIGS. 1A, 1B, 3A-3C, and 5C) to an open configuration (e.g., the position shown in FIG. 5A). In some examples the fully open position or configuration may include at least a portion of a top, exterior surface of the lid 104 being in contact with a rear (or other) side portion 114 of the base portion 102 of the insulating container 100.

As illustrated in FIG. 5A, some example insulating containers may include a plurality of foam plugs 130 in the underside of the lid 104. In other examples, the foam plug 130 may further include an accessory clip 132. The accessory clip may be configured to engage with and secure additional accessories or devices to the bottom (i.e., underside) of the lid 104 for convenient storage. For example, a net mesh accessory may be attached to a plurality of clips 132. In some examples, the net mesh (not shown) may be constructed of a flexible rubber and it may prevent certain items from getting exposed to water or ice residing in the interior void of the insulating container. Other accessories such as trays or baskets may be stored in the bottom of the interior void of the insulating container, and/or may be configured to rest at the top of the interior void. In some examples, a tray or basket may include a lip around the perimeter of the tray (not shown) that allows the tray to hang from the edge of the opening 112 while remaining within the interior void of the insulating container. Such a configuration allows the lid 104 to be configured in the closed and secured position thereby sealing the interior void while the tray or basket is secured in place inside/within the insulating container 100.

Figure 5B:
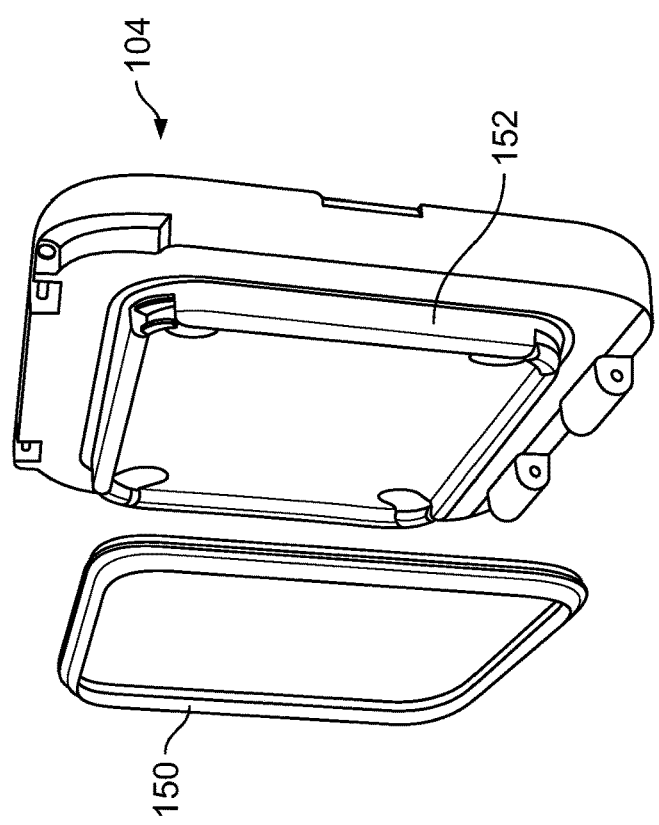
FIG. 5B is a perspective view of a detached lid with an exemplary gasket removed according to one or more aspects described herein.

As illustrated in FIGS. 5A and 5B, the underside of the lid 104 may include a logo or name of a company or manufacturer of the insulating container that is embossed, integrally molded, or pressed into the bottom of the lid 104.

In addition, in some examples, the insulating container may include a gasket or other sealing device. The gasket may be arranged in either the lid or the base and may aid in sealing the lid and the base when the lid is in a closed and secured configuration. In other examples, the gasket may be arranged in either the lid or the base and may provide a watertight seal when the lid is in a closed and secured configuration. In some examples, the gasket may be seated in a recess formed in at least one of the base and the lid and extending around a perimeter of the at least one of the base or the lid. In other examples, as shown in FIG. 5B, the gasket 150 may be seated in a gasket adapter 152 formed in at least one of the base 102 or the lid 104 and extending around a perimeter of the at least one of the base or the lid. In other examples, the gasket 150 may be constructed of rubber, silicone, or other suitable material. The gasket may aid in maintaining the temperature of the contents or liquid contained within the insulating container. Various other gasket examples may be used with any of the insulating containers described herein.

In some examples, the gasket may include strategically placed cut-outs that may reduce or eliminate a need for a vent (e.g., a vent to prevent lid lock), as will be discussed more fully below. In some examples, the gasket may be a traditional gasket having a substantially circular cross section. In other examples, the gasket may have a particular cross section configured to aid in venting the insulting container. In some examples, the cross section is a V-shaped or substantially V-shaped portion of the gasket. In yet other examples, the gasket may also include at least one weep hole to allow passive venting of air or fluids in and out of the interior void when the insulating container is in a closed and secured configuration to prevent lid lock. In other examples, the gasket may include a plurality of weep holes. In still other examples, the gasket is configured to provide a watertight seal when the lid is in a closed and secured configuration.

In some examples, the lid 104 may be configured to remain secured or locked in a closed position using latching devices 120. The latching devices 120 may be various types of latches, including a latch having a latch portion and a keeper portion on the base 102, as well as various other types of latches.

Figure 6C:
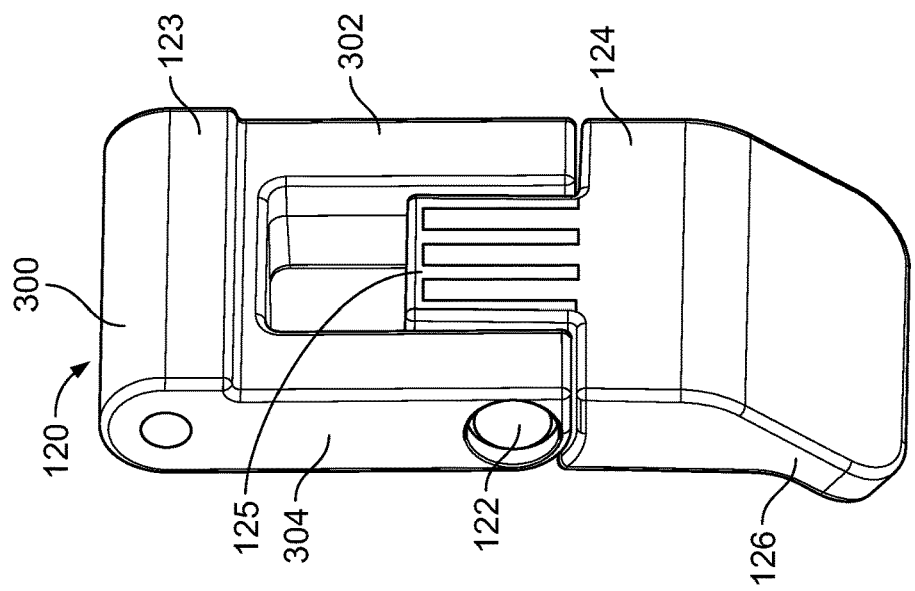
FIGS. 6A-6C illustrate front, perspective, and rear views of a latch or latching device arrangement to secure the lid in a closed configuration according to one or more aspects described herein.
Figure 6B:
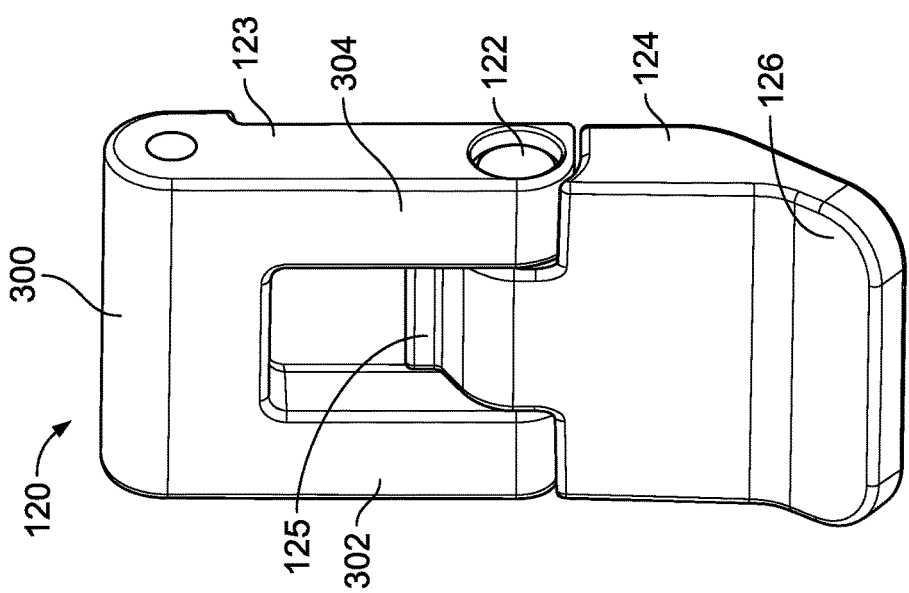
Figure 6A:
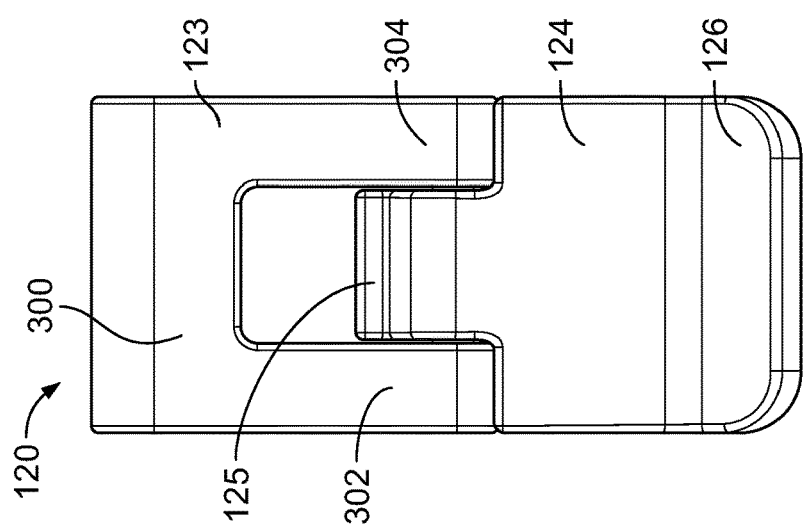

FIG. 1A illustrates the latching device 120 in a closed and secured position, while FIG. 5C illustrates the latching device 120 in an unsecured position while the lid 104 is in a closed, but unsecured configuration. When in a secured position, the latching device 120 is positioned such that the lid 104 abuts the base 102 of the insulating container 100, thus closing, securing, and/or sealing the container. To disengage the latching device 120, the grasping portion or latch lower 124, as shown in FIG. 6A, is pulled/flipped away from the base 102 of the container 100. In other words, the latch upper 123 stretches so that the latch lower engaging tab 125 disengages from the latch keeper 140. Once the engaging tab 125 clears the latch keeper 140, the latch 120 is swung upward, away from the container, and in an arc. As illustrated in FIGS. 6A-6C, the latch lower 124 may be pivotally attached and secured to the latch upper 123. The latch upper 123 may be pivotally attached and secured to the lid 104 of the insulating container 100.

Similarly, to close the container 100, the latch device 120 is moved in a downward arc, toward the container 100. When the movement of the latch upper 123 and the latch lower 124 reaches the latch keeper 140, the latch lower 124 is rotated so the engaging tab 125 is positioned downward, toward the base 102 and the engaging tab 125 is seated/positioned within the keeper groove 142 in the bottom of the keeper 140, as shown in FIG. 5C. The latch lower 124 is then rotated/pushed downward until the latch lower 124 and latch upper 123 are seated and secured. When in the seated and secured position, the latch upper 123 is stretched and tensioned thus maintaining a constant downward force on the lid 104 securing and sealing it in the closed configuration. In certain examples, the latch lower may be more rigid than the latch upper. In some examples, the latch upper may be more rigid than the latch lower. In still other examples, the engaging tab may be formed of a rigid material and the latch lower may be formed of an elastomeric material. The latch lower and the engaging tab may be formed by co-molding or injection molding (e.g., multi-material injection molding). In other examples, the engaging tab of the latch lower is a rigid material and the remainder of the latch lower is an elastomeric material. In some examples, the latch lower and the engaging tab may be formed of the same materials. In another example, the latch upper and the latch lower may be not be elastic and/or the latch upper and the latch lower may be semi-rigid. In this example, the gasket is further configured to compress allowing the latch lower to be rotated so that the engaging tab can be seated/positioned within the keeper groove in the bottom of the keeper thus securing the lid in the closed configuration. In certain examples, the gasket may be further configured as the elastic component (i.e., in place of the latch upper or lower) to provide the necessary clearance required to engage the latch lower engaging tab with the latch keeper. When in the seated and secured position, the latch upper and latch lower maintain the lid in a position that compresses the gasket. The gasket thus maintains a constant force on the lid securing and sealing the lid in the closed and configuration. Further, when in the seated position, the latch upper 123 and the latch lower 124 of the latch 120 may be mostly recessed within the latch slot 141, and, in some examples, the latch mechanism 120 does not extend or protrude beyond the surface thereof. In other examples, the latch device/mechanism 120 is substantially rectangular shaped when the lid 104 is secured in the closed position/configuration.

As will be understood by one of ordinary skill in the art, the latch upper 123 is made of materials and sized such that when in the closed/seated and secured position, enough force remains to maintain the closed position of the container lid 104. In other words, in the closed position, a certain amount of tension is maintained on the latch upper 123 as it is not completely returned to its unstretched position/state. In some examples, the latch upper 123 may be an elastomeric rubber and the latch lower 124 may be a rigid plastic or composite material. In other examples, the latch upper 123 may be a rigid plastic or composite material and the latch lower 124 may be an elastomeric rubber. In yet other examples, the latch upper 123 may be constructed of both an elastomeric rubber and/or a rigid plastic or composite material. In still other examples, the latch lower 124 may be constructed of both an elastomeric rubber and/or a rigid plastic or composite material. In certain examples, the latch upper 123 and/or latch lower may be wholly or partly constructed of a semi-rigid and/or semi-elastomeric material. In another example, both the latch upper 123 and the latch lower 124 are an elastomeric rubber. In still another example, both the latch upper 123 and the latch lower 124 are a rigid plastic or composite material. In the closed position, the engaging tab 125 of the latch lower 124 is received within the recessed groove 142 of the latch keeper 140. In some example examples, the engaging tab 125 is sized and shaped so as to provide maximum contact with the recessed groove 142, thus ensuring an easily maintainable closure.

One example latching device 120 that may be used with the insulating container 100 is described with reference to FIGS. 6A-6C. The latching device 120 shown and described is merely one example latch that may be used and various other types of latches may be used without departing from the invention.

FIGS. 6A-6C are front, perspective, and rear views of an example latching device 120 to secure the lid in a closed configuration. The latching device 120 includes a latch upper 123 and a latch lower 124. The latch lower further includes engaging tab 125 configured to engage a groove or slot 142 formed on the bottom of keeper portion 140. The latch lower may further include a finger lift 126 positioned opposite the engaging tab 125. In other examples, the finger lift 126 may extend out and away or distally from the insulating container lid 104.

According to one aspect of the invention, the latch upper 123 is made of a flexible, stretchable, resilient, elastomeric, one-piece molded material that is typically pivotally/hingedly attached to the lid portion 104 of the container 100 and received within a recessed, elongated latch slot 145 which is typically integrally molded to the container 100. In some examples, the latch slot may be integrally molded as part of both the lid 104 and the bottom portion 102. The latch upper 123 and latch lower 124 may be molded in a single-piece construction from rubbery materials as would be understood by those of ordinary skill in the art. The latch upper 123 and latch lower 124 may also be formed of a material that is formed or made from a plastics material or another suitable material which can be formed or molded into a shape and thus retain the shape to which it has been formed. The latch upper 123 and latch lower 124 may be made of sufficient size, thickness and materials of construction to withstand repeated cycles of stress as the latch 120 is engage/disengaged with the latch keeper 140 over time.

As further depicted in FIGS. 6A-6C, the latch upper 123 may include a base 300, a first arm 302, and a second arm 304. The first arm 302 and the second arm 304 may be substantially perpendicular to the base 300. The first arm 302 may be substantially parallel to the second arm 304. The latch upper 123 may be substantially shaped like an inverted U. In other examples, the latch lower 124 includes the engaging tab 125. Engaging tab 125 may be configured to pivotally rotate within/between the latch upper first arm 302 and the latch upper second arm 304. In another example, the keeper 140, as shown in FIG. 1A, may be located between the latch upper first arm 302, the latch upper second arm 304, and below the latch upper base 300. FIG. 1A further illustrates that the keeper 140 may be flush with the latch upper base 300, first arm 302, second arm 304, and latch lower 124 when the insulating container lid is in the closed and secured configuration.

FIGS. 6B and 6C illustrate that latch lower 124 may be pivotally attached to the latch upper 123 and secured to the latch upper 123 by latch lower pin 122. Latch upper 123 may be pivotally attached to lid 104 and secured to the lid 104 by latch upper pin 121, as shown in FIG. 5C.

In some examples, the latch 120 is configured such that the finger lift 126 extends from the latch lower 124 at an angle that departs from the plane of the latch 120. The angle between the finger lift 126 and the latch lower 124 and the latch upper 123 may aid in or facilitate grasping the finger lift 126 by a user. At this angle, the user is easily able to slip his or her fingers between the finger lift 126 and the side of the base portion 102 of the insulating container 100 for disengaging the latch 120 from the keeper 140. Further, because the latch upper 123 is made from a resilient material, even though the finger lift 126 may extend from the body of the container, it is not easily dislodged or broken.

The finger lift 126, as best shown in FIG. 6B, is typically formed into a shape that is easily grasped or accessed by a user. Without intending to be limited thereby, other shapes and geometries are contemplated for the finger lift 126 for manipulation of the latch 120.

Similar to the examples discussed above, another feature of the latching mechanism or device 120, the latch keeper 140 may be integrally molded within the base portion 102. The latch keeper 140 may be positioned within an elongated keeper slot 141. As previously discussed, the latch keeper may include a groove or slot 142 formed in the bottom of the keeper 140. The recessed groove 142 is typically configured for receiving the engaging tab 125 of the latch lower 124. In other examples, the latch keeper 140 may be substantially square or substantially rectangular shaped. Similarly, the elongated keeper slot 141 may be substantially rectangular shaped. This combination of features provides a strong and very secure lid latching system.

Figure 7A:
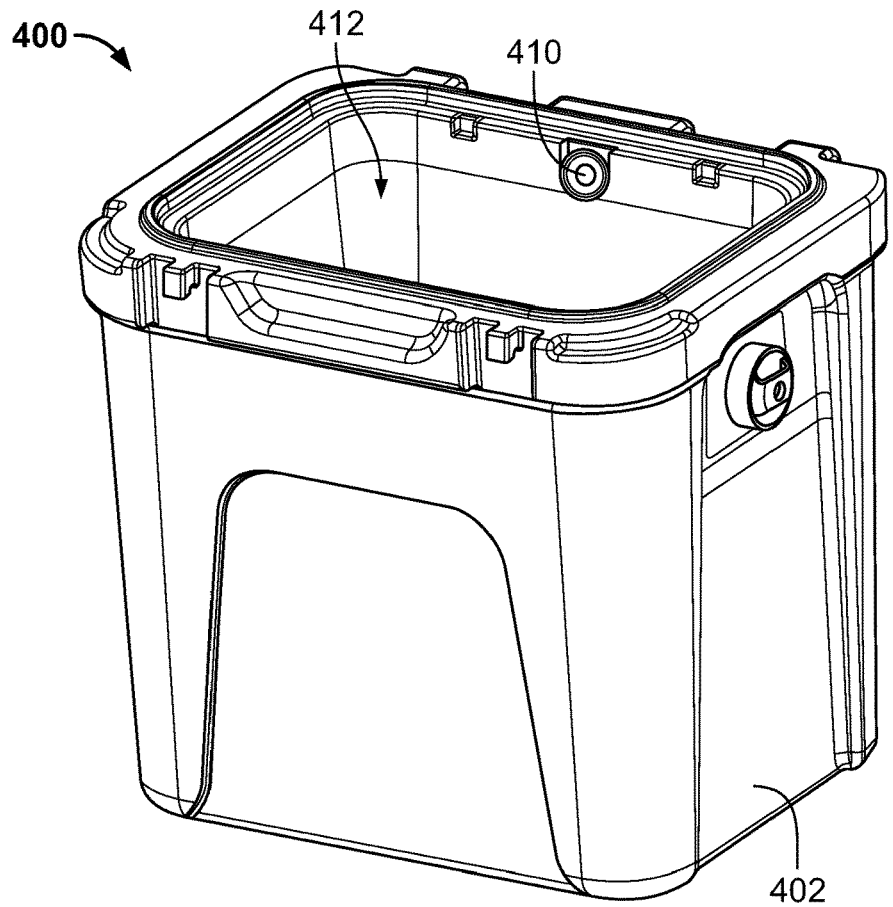
FIGS. 7A-7B illustrate a front top perspective view, and a rear perspective view of another example insulating container with the lid removed and including a pressure regulation device in the back or rear side of the insulating container according to one or more aspects described herein.
Figure 7B:
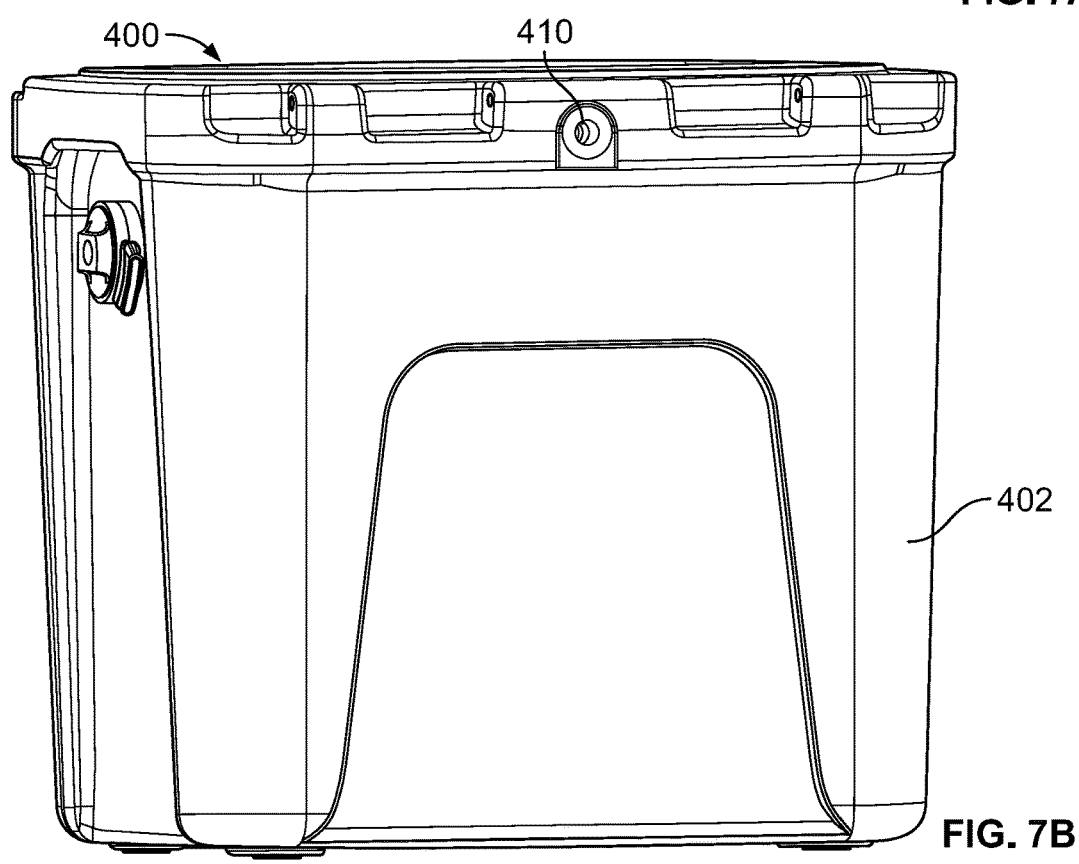
Figure 8A:
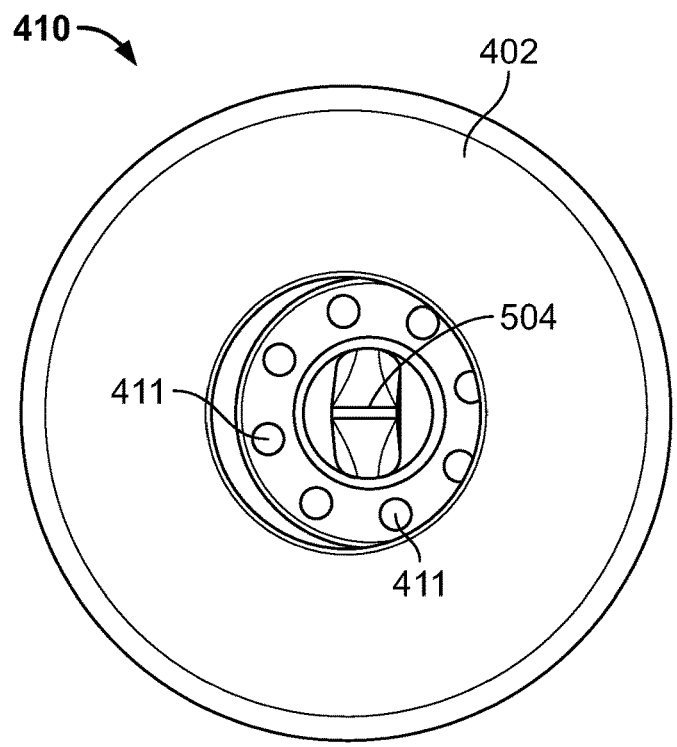
FIGS. 8A-8B illustrate various expanded views of a pressure regulation device of the insulating container shown in FIGS. 7A-7B according to one or more aspects described herein.
Figure 8B:
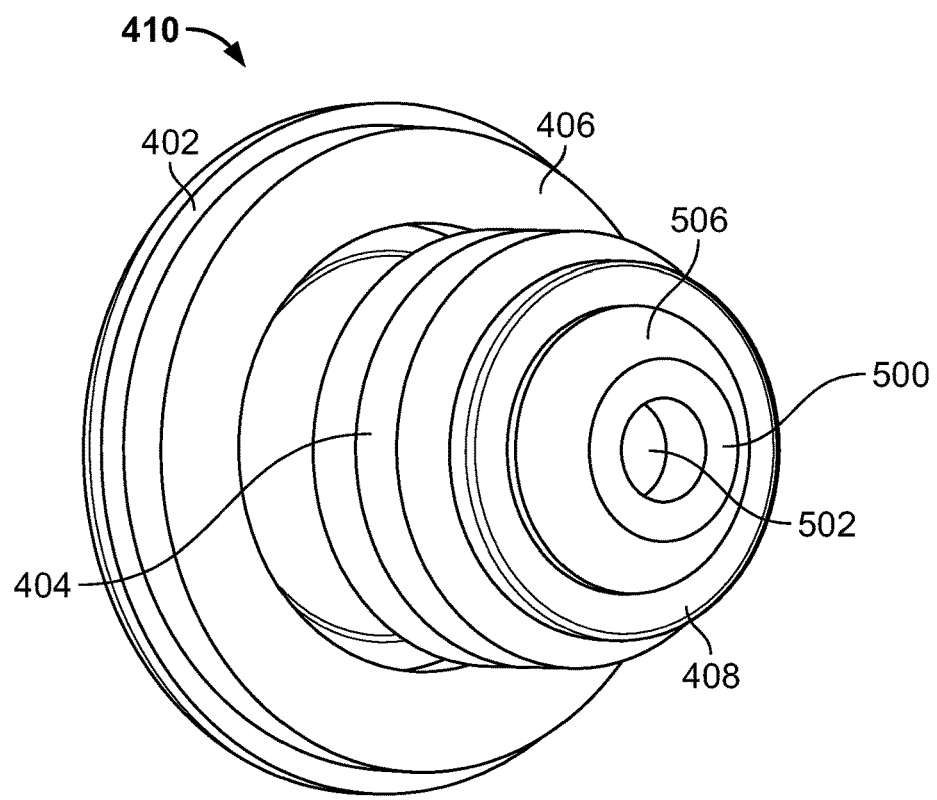

FIGS. 7A-7B illustrate another example insulating container 400 with the lid removed to better illustrate the interior void 412. In some examples, at least one pressure regulation device 410 may be configured in the rear side portion 414 of the base 402. The pressure regulation device 410 may be configured to regulate the internal pressure of the interior void 412 with the external atmospheric pressure. The pressure regulation device 410 may be permanently affixed or removably inserted into a bore (not shown) integrally molded in the rear side portion 414. In certain examples, the pressure regulation device may include vent 402 positioned on the interior rear side portion 414 and within the interior void 412. In some examples, vent 402 may include a plurality of umbrella valve vents 411 configured to allow the one way passage and release of air from the interior void 412 via an umbrella valve 500, as shown in FIGS. 8A and 8B. The pressure regulation valve may also include a vent gasket 406, umbrella valve gasket 408, and vent stem 404, as shown in FIG. 8B. In certain examples, the vent stem 404 may include a plurality of ribs configured to provide a friction or press fit in a substantially cylinder-shaped bore integrally molded in the rear side portion 414. In still other configurations, the pressure regulation device may be secured in the rear side portion 414 by an adhesive, RF welding, etc. In another example, the umbrella valve 500 may be configured within and over the stem 404 and umbrella gasket 408. In other examples, the pressure regulation device may also include a duckbill valve 504 within the stem 404.

Figure 9A:
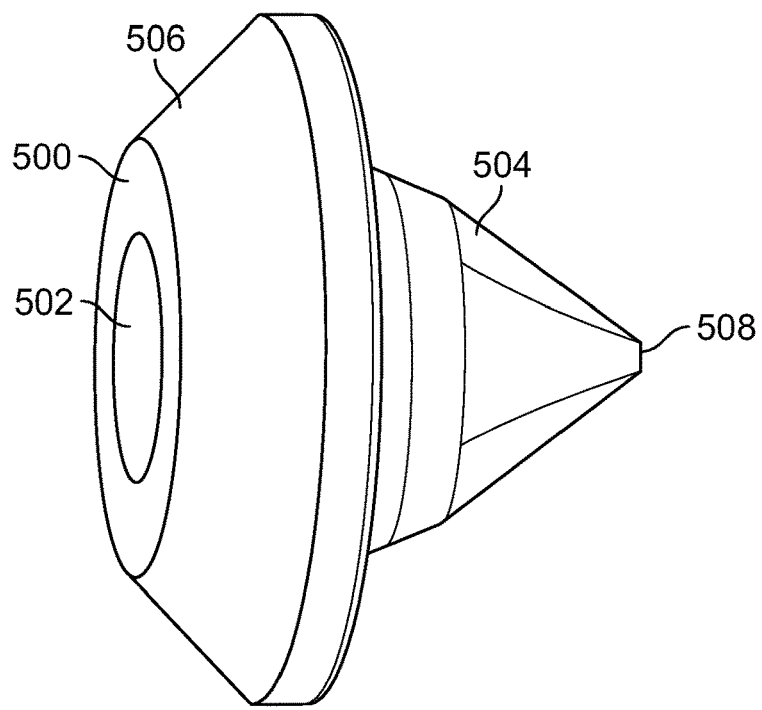
FIGS. 9A-9B illustrate various expanded views of a duckbill-umbrella valve comprising the pressure regulation device as shown in FIGS. 8A-8D according to one or more aspects described herein.
Figure 9B:
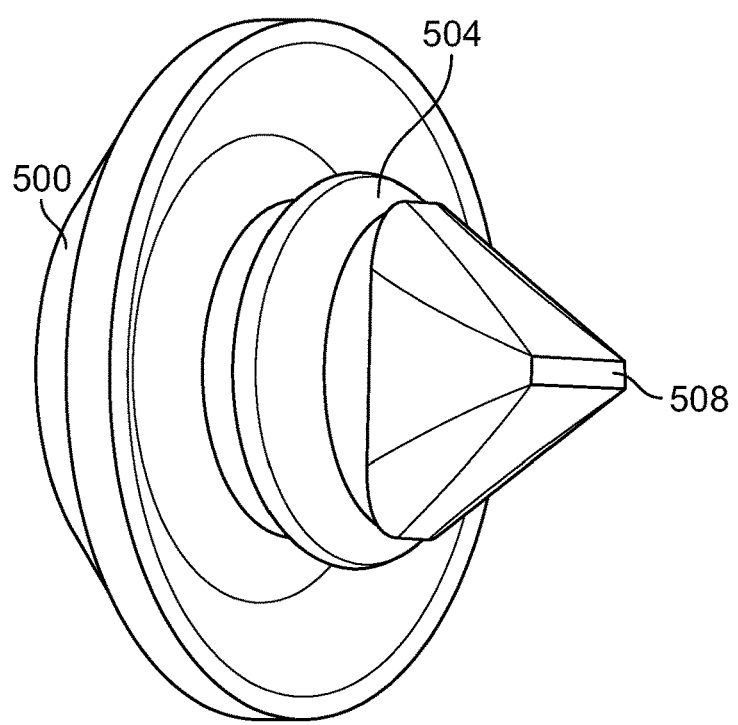

As shown in FIGS. 8A, 9A, and 9B, the pressure regulation device 500 may include umbrella valve 500 and duckbill valve 504. The duckbill valve 504 and umbrella valve 500 may be configured to allow the passive transmission of air into and out of the interior void 412 of the insulating container 400 to regulate and potentially equalize the internal pressure of the insulating container 400 with the atmospheric pressure. In one example, the umbrella valve 500 is an elastomeric valve with a diaphragm-shaped sealing disk 506 that creates a seal over the umbrella valve vents 411. When the pressure within the interior void 412 reaches a predetermined level, the proper force is reached to lift the convex diaphragm 506 from the umbrella valve vents 411 to allow flow of air in a one-way direction (i.e., out of the interior void 412). The diaphragm 506 is further configured to prevent the back flow immediately in the opposite direction of air. The pressure regulation device thus reduces the pressure within the insulating container, for example, when the atmospheric pressure is reduced (e.g., climbing a mountain or driving up a hill). In still other examples, the pressure regulation device 410 may also include a duckbill valve 504. The duckbill valve 504 includes a channel 502 configured to allow the passage of air from the exterior of the insulating container 400 into the interior void 412 when the internal pressure of the interior void 412 is less than the atmospheric pressure. In another example, the duckbill valve 504 may be a one-piece, elastomeric component that includes a channel 502. The valve 504 may include elastomeric lips 508 substantially shaped like a duckbill configured to prevent the backflow of fluid out of the interior void 412 and configured to allow the flow of air into the interior void 412 when the atmospheric pressure is greater than the internal pressure of the insulating container 400 (e.g., descending from a mountain or driving down a hill).

Additionally or alternatively, various other venting or pressure regulation arrangements may be used without departing from the invention. For instance, a portion of the base may include a material that is breathable for air but does not permit water or other liquids to penetrate. This mesh material may allow venting without permitting spillage of the liquid contained within the insulating container.

The insulating containers described herein include various features that ensure easy and efficient manufacture of the insulating containers, while providing durability and wear resistance. The insulating containers and the various integrally molded features, such as side pocket handles, pressure regulation mechanisms or devices, latch devices, etc., may be advantageous in improving durability and wear resistance.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. An insulating container, comprising:
    a base including:
        a sidewall structure having a plurality of sides;
        a bottom portion connected to a first end of each side of the plurality of sides of the sidewall structure, the bottom portion being configured to support the insulating container on a surface;
        the plurality of sides of the sidewall structure defining an opening at a second end, opposite the first end of each side of the plurality of sides of the sidewall structure, the opening being configured to allow access to an interior void of the insulating container formed by the sidewall structure and the bottom portion, and wherein a gasket is configured to seal the opening when a lid is in a closed position; and
    at least one latch device configured to secure the lid when the lid is in a closed position and wherein the gasket is further configured to provide a watertight seal when the latch device secures the lid, the latch device further including:
        a latch upper, wherein a top portion of the latch upper is pivotally attached to the lid; and a latch lower, wherein a top portion of the latch lower is pivotally attached to a bottom portion of the latch upper,
        wherein the latch lower further includes an engaging tab,
        wherein the engaging tab is configured to engage a keeper when the lid is secured in the closed position,
        wherein the keeper is positioned on a front side of the bottom portion of the insulating container,
        wherein the latch upper and the latch lower when in a closed position are maintained in a recessed position, and flush with a front side of the lid and flush with a front side of the bottom portion of the insulating container, and
        wherein the keeper is flush with the latch upper and the latch lower when the latch device secures the lid in a closed position.

2. The insulating container of claim 1, wherein the latch device is substantially rectangular shaped when the lid is secured in the closed position.

3. The insulating container of claim 1, wherein the latch upper is an elastomeric material.

4. The insulating container of claim 1, wherein the latch lower comprises rigid and elastomeric materials, and wherein the latch lower is more rigid than the latch upper.

5. The insulating container of claim 1, wherein the latch device further includes a latch upper pin configured to pivotally secure the latch upper to the lid, and a latch lower pin configured to pivotally secure the latch lower to the latch upper.

6. The insulating container of claim 1, wherein the latch upper further includes a base, a first arm, and a second arm, wherein the first arm and the second arm are substantially perpendicular to the base, wherein the first arm and the second arm are substantially parallel to each other, and wherein a front of the latch upper is a substantially inverted U-shape.

7. The insulating container of claim 6, wherein the latch lower engaging tab is located between the first arm and the second arm of the latch upper when the latch lower is pivotally secured to the latch upper.

8. The insulating container of claim 1, wherein the engaging tab of the latch lower is more rigid than the remainder of the latch lower.

9. The insulating container of claim 1, wherein the gasket further includes at least one weep hole, and wherein the gasket is configured to passively allow regulation of the pressure between the interior void and the atmosphere when the lid is in the closed position.

10. A latch device for securing a lid of an insulating container comprising:
    a latch upper, wherein the latch upper is pivotally secured to an insulating container lid by a latch upper pin, and wherein the latch upper is an elastomeric material; and
    a latch lower, wherein the latch lower is pivotally secured to the latch upper by a latch lower pin, wherein the latch lower is more rigid than the latch upper,
        wherein the latch lower further includes an engaging tab,
        wherein the engaging tab is configured to engage an insulating container keeper when the lid is secured in a closed position,
        wherein the latch upper pin is above the latch lower pin when the lid is secured in the closed position, and
        wherein the keeper is positioned on a front side of a bottom portion of the insulating container.

11. The latch device of claim 10, wherein the latch device is substantially rectangular shaped when the lid is secured in the closed position.

12. The latch device of claim 11, wherein the latch upper and the latch lower when in a closed position are maintained in a recess, and flush with a front side of the insulating container lid and flush with a front side of a bottom portion of the insulating container when the latch device secures the lid in a closed position, and wherein the insulating container keeper is flush with the latch upper and the latch lower when the latch device secures the lid in a closed position.

13. The latch device of claim 11, wherein the engaging tab of the latch lower is a rigid material and the remainder of the latch lower is an elastomeric material.

14. The latch device of claim 13, wherein the latch lower engaging tab is located between the first arm and the second arm of the latch upper when the latch lower is pivotally secured to the latch upper.

15. The latch device of claim 10, wherein the latch upper further includes a base, first arm, and a second arm, wherein the first arm and the second arm are substantially perpendicular to the base, wherein the first arm and the second arm are substantially parallel to each other, and wherein the latch upper is a substantially inverted U-shape.

16. The latch device of claim 15, wherein the latch lower further includes a finger lift positioned opposite the engaging tab and distal from the insulating container lid.

17. The latch device of claim 10, wherein the keeper further includes a groove configured in a bottom side of the keeper, and wherein the latch lower engaging tab is configured to engage the groove when the latch device secures the lid in a closed position.

18. The latch device of claim 10, wherein the latch upper is tensioned when the latch device secures the lid in a closed position.

19. An insulating container comprising:
a base including:
a sidewall structure having a plurality of sides;
a bottom portion connected to a first end of each side of the plurality of sides of the sidewall structure, the bottom portion being configured to support the insulating container on a surface;
an opening formed at a second end of each side of the plurality of sides of the sidewall structure, opposite the first end of each side of the plurality of sides of the sidewall structure, the opening being configured to allow access to an interior void of the insulating container formed by the sidewall structure and the bottom portion, wherein a gasket is configured to provide a watertight seal when a lid is in a closed and secured position; and
at least two latch devices configured to secure the lid when the lid is in a closed position, the latch devices further including:
a latch upper wherein the latch upper is pivotally attached to the lid; and
a latch lower wherein the latch lower is pivotally attached to the latch upper,
wherein the latch lower further includes an engaging tab,
wherein the engaging tab is configured to engage a keeper,
wherein the latch lower is formed of a first material and the latch upper is formed of a second material, wherein the first material is more rigid than the second material, and
wherein the keeper is positioned on a front side of the bottom portion of the insulating container.

20. An insulating container, comprising:
a base including:
a sidewall structure having a plurality of sides;
a bottom portion connected to a first end of each side of the plurality of sides of the sidewall structure, the bottom portion being configured to support the insulating container on a surface;
the plurality of sides of the sidewall structure defining an opening at a second end, opposite the first end of each side of the plurality of sides of the sidewall structure, the opening being configured to allow access to an interior void of the insulating container formed by the sidewall structure and the bottom portion, and wherein a gasket is configured to seal the opening when a lid is in a closed position; and
at least one latch device configured to secure the lid when the lid is in a closed position and wherein the gasket is further configured to provide a watertight seal when the latch device secures the lid, the latch device further including:
a latch upper, wherein a top portion of the latch upper is pivotally attached to the lid; and a latch lower, wherein a top portion of the latch lower is pivotally attached to a bottom portion of the latch upper,
wherein the latch lower further includes an engaging tab,
wherein the engaging tab is configured to engage a keeper when the lid is secured in the closed position,
wherein the keeper is positioned on a front side of the bottom portion of the insulating container,
wherein the latch lower comprises rigid and elastomeric materials, and
wherein the latch lower is more rigid than the latch upper.

21. An insulating container, comprising:
a base including:
a sidewall structure having a plurality of sides;
a bottom portion connected to a first end of each side of the plurality of sides of the sidewall structure, the bottom portion being configured to support the insulating container on a surface;
the plurality of sides of the sidewall structure defining an opening at a second end, opposite the first end of each side of the plurality of sides of the sidewall structure, the opening being configured to allow access to an interior void of the insulating container formed by the sidewall structure and the bottom portion, and wherein a gasket is configured to seal the opening when a lid is in a closed position; and
at least one latch device configured to secure the lid when the lid is in a closed position and wherein the gasket is further configured to provide a watertight seal when the latch device secures the lid, the latch device further including:
a latch upper, wherein a top portion of the latch upper is pivotally attached to the lid; and a latch lower, wherein a top portion of the latch lower is pivotally attached to a bottom portion of the latch upper,
wherein the latch lower further includes an engaging tab,
wherein the engaging tab is configured to engage a keeper when the lid is secured in the closed position,
wherein the keeper is positioned on a front side of the bottom portion of the insulating container, and
wherein the engaging tab of the latch lower is more rigid than the remainder of the latch lower.

* * * * *